(12) United States Patent
Shin et al.

(10) Patent No.: US 11,122,537 B2
(45) Date of Patent: Sep. 14, 2021

(54) METHOD FOR ESTIMATING DISTANCE BETWEEN D2D TERMINALS AND APPARATUS FOR METHOD IN WIRELESS COMMUNICATION SYSTEM

(71) Applicant: LG ELECTRONICS INC., Seoul (KR)

(72) Inventors: Seokmin Shin, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 508 days.

(21) Appl. No.: 16/095,819

(22) PCT Filed: Dec. 20, 2016

(86) PCT No.: PCT/KR2016/014928
§ 371 (c)(1),
(2) Date: Oct. 23, 2018

(87) PCT Pub. No.: WO2017/188547
PCT Pub. Date: Nov. 2, 2017

(65) Prior Publication Data
US 2021/0227491 A1    Jul. 22, 2021

Related U.S. Application Data

(60) Provisional application No. 62/327,389, filed on Apr. 25, 2016.

(51) Int. Cl.
*H04W 64/00* (2009.01)
*G01S 5/02* (2010.01)
(Continued)

(52) U.S. Cl.
CPC ......... *H04W 64/006* (2013.01); *G01S 5/0249* (2020.05); *H04W 8/005* (2013.01); *H04W 24/10* (2013.01); *H04W 74/0833* (2013.01)

(58) Field of Classification Search
CPC ... H04W 64/006; H04W 24/10; H04W 8/005; H04W 74/0833; G01S 5/0249
See application file for complete search history.

(56) References Cited

U.S. PATENT DOCUMENTS

| 2013/0316727 A1 | 11/2013 | Edge |
| 2015/0018017 A1 | 1/2015 | Jang et al. |

(Continued)

FOREIGN PATENT DOCUMENTS

| KR | 20010021174 | 3/2001 |
| KR | 20070061454 | 6/2007 |
| KR | 20130063650 | 6/2013 |

OTHER PUBLICATIONS

PCT International Application No. PCT/KR2016/014928, International Search Report dated Feb. 22, 2017, 3 pages.

*Primary Examiner* — Steven H Nguyen
(74) *Attorney, Agent, or Firm* — Lee, Hong, Degerman, Kang & Waimey

(57) ABSTRACT

A method for estimating the distance between device-to-device (D2D) terminals in a wireless communication system according to the present specification, carried out by a first D2D terminal, is characterized by comprising the steps of: receiving, from a second D2D terminal, a particular message comprising first distance information, regarding the differences in distance between the second D2D terminal and at least three reference base stations configured thereby, and second distance information indicating the distances between said at least three reference base stations; measuring the distance to each reference base station; and estimating the distance to the second D2D terminal by means of the measured distance to each reference base station, first distance information and second distance information.

12 Claims, 20 Drawing Sheets

(51) Int. Cl.
*H04W 74/08* (2009.01)
*H04W 24/10* (2009.01)
*H04W 8/00* (2009.01)

(56) References Cited

U.S. PATENT DOCUMENTS

| | | | |
|---|---|---|---|
| 2016/0165398 A1* | 6/2016 | Seo | G01S 11/02 |
| | | | 455/456.6 |
| 2017/0034688 A1* | 2/2017 | Kim | G01S 5/26 |
| 2017/0150330 A1* | 5/2017 | Kim | H04W 48/16 |
| 2018/0077529 A1* | 3/2018 | Ryu | G01S 5/14 |

\* cited by examiner

[FIG. 1]
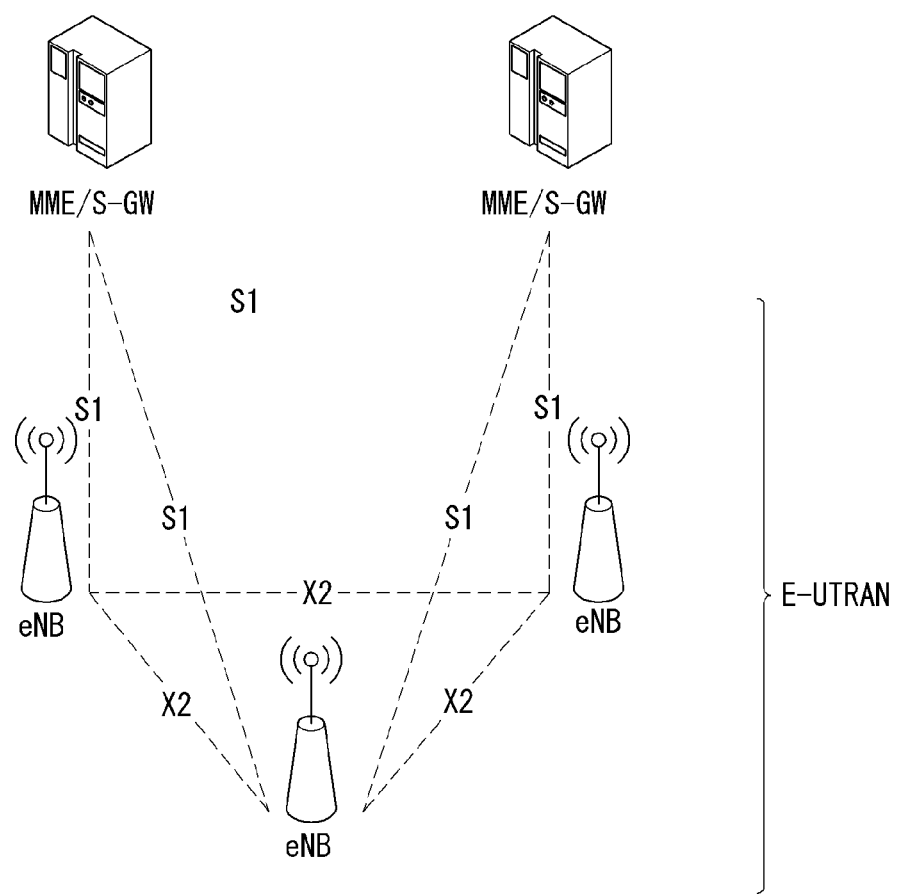

[FIG. 2]
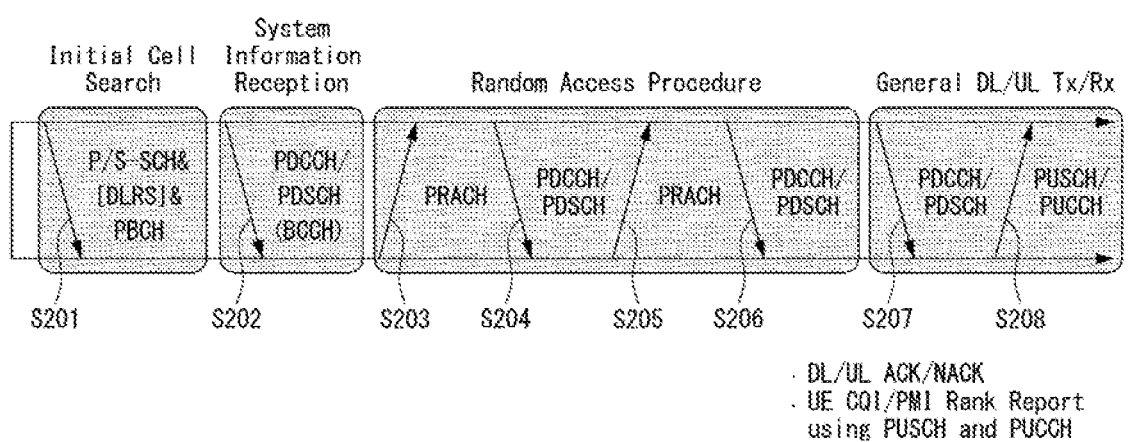

[FIG. 3]
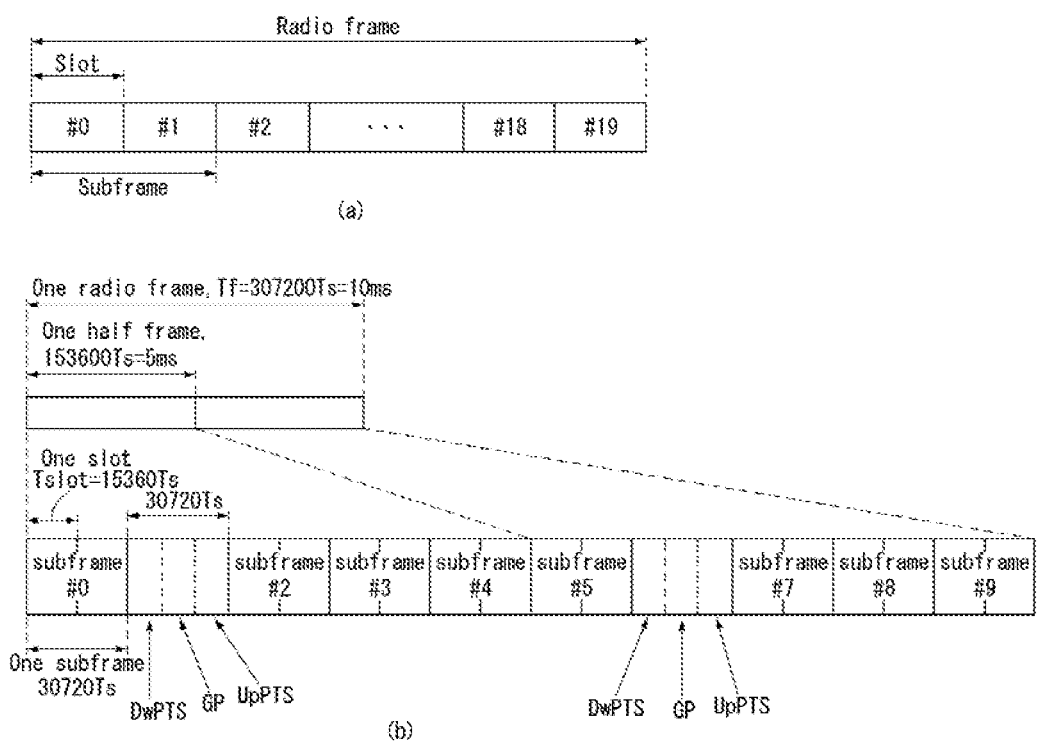

[FIG. 4]
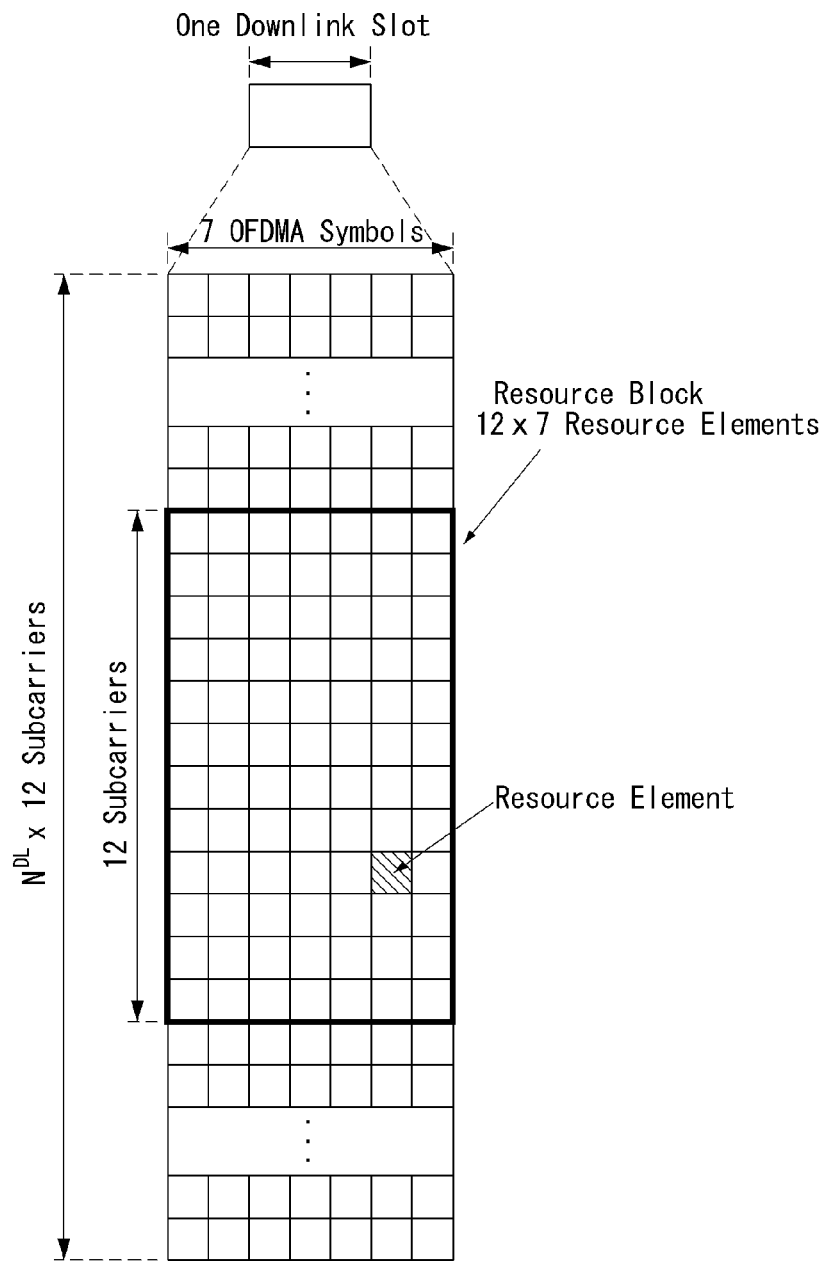

[FIG. 5]
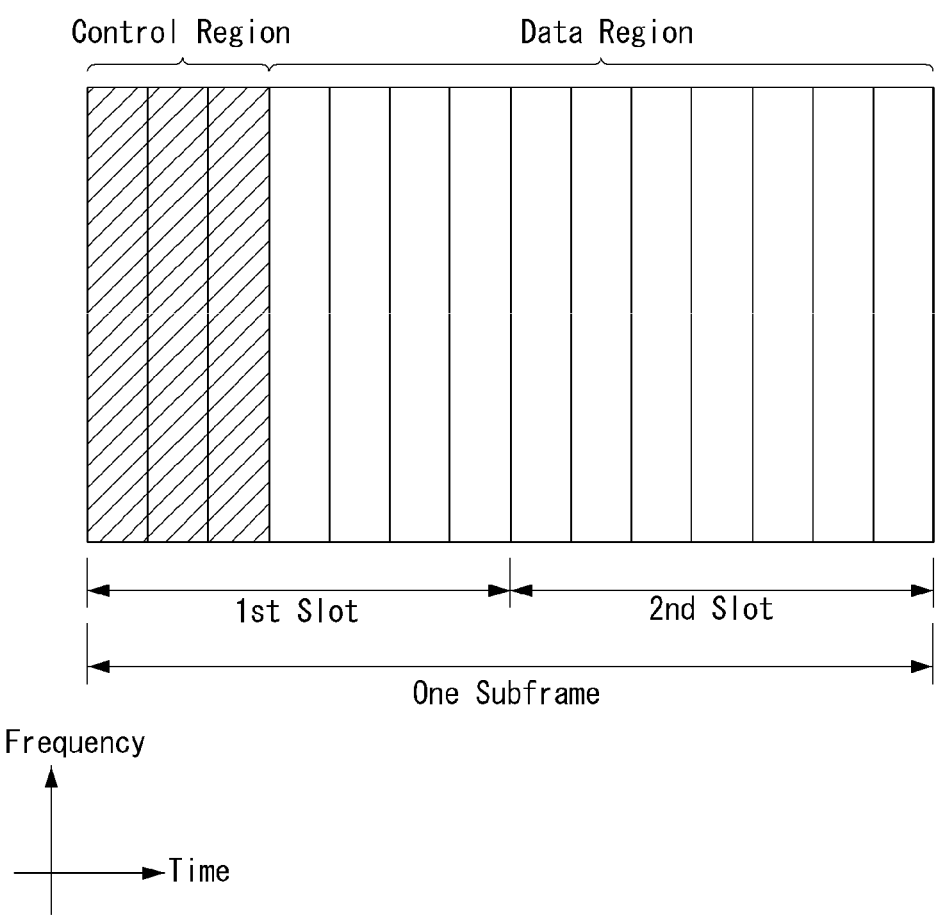

[FIG. 6]
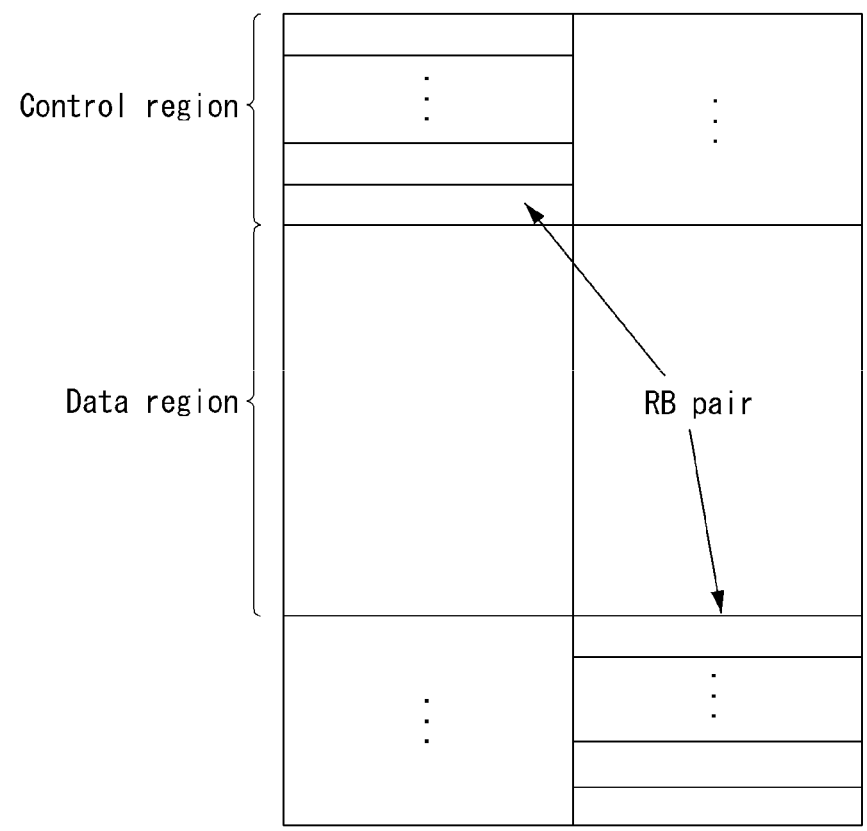

[FIG. 7]
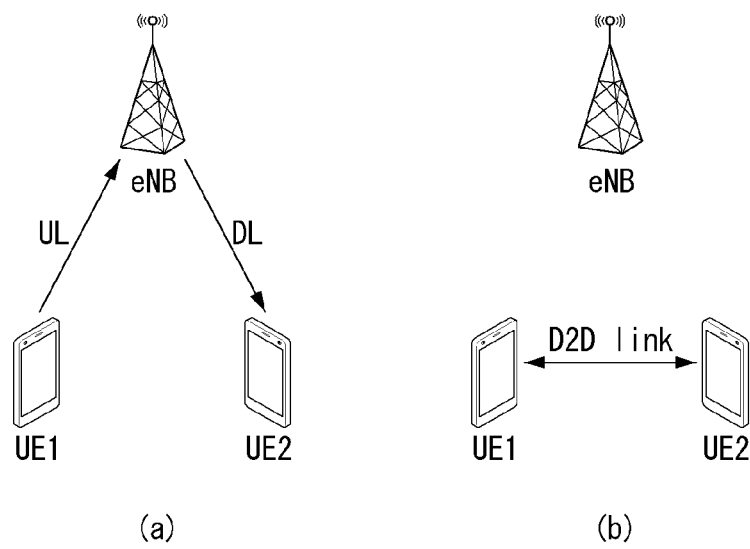

[FIG. 8]
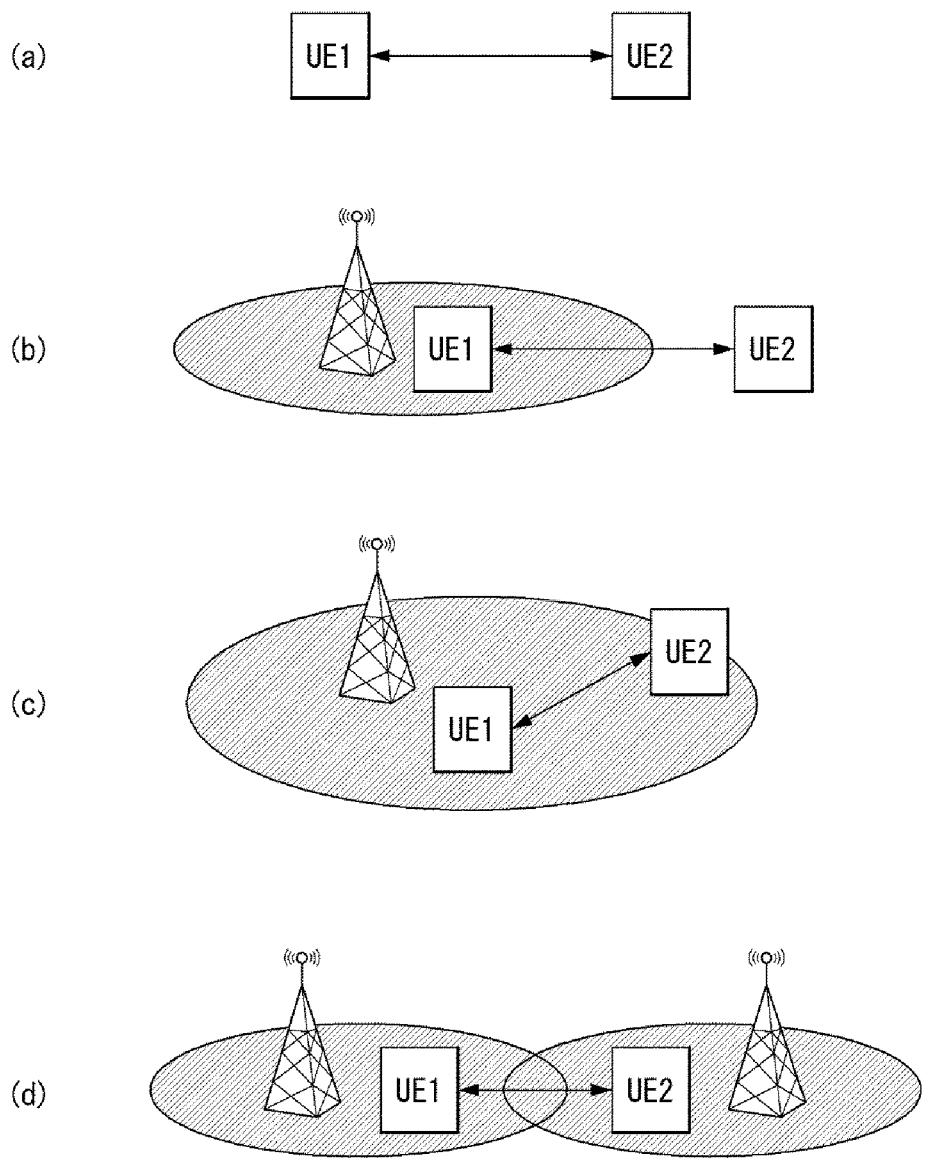

[FIG. 9]
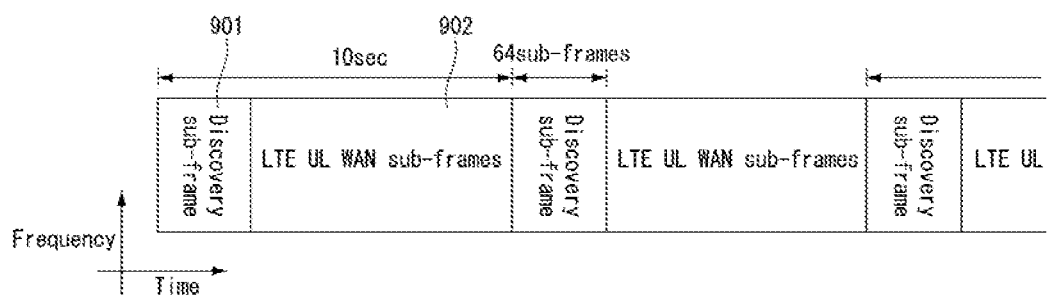

[FIG. 10]
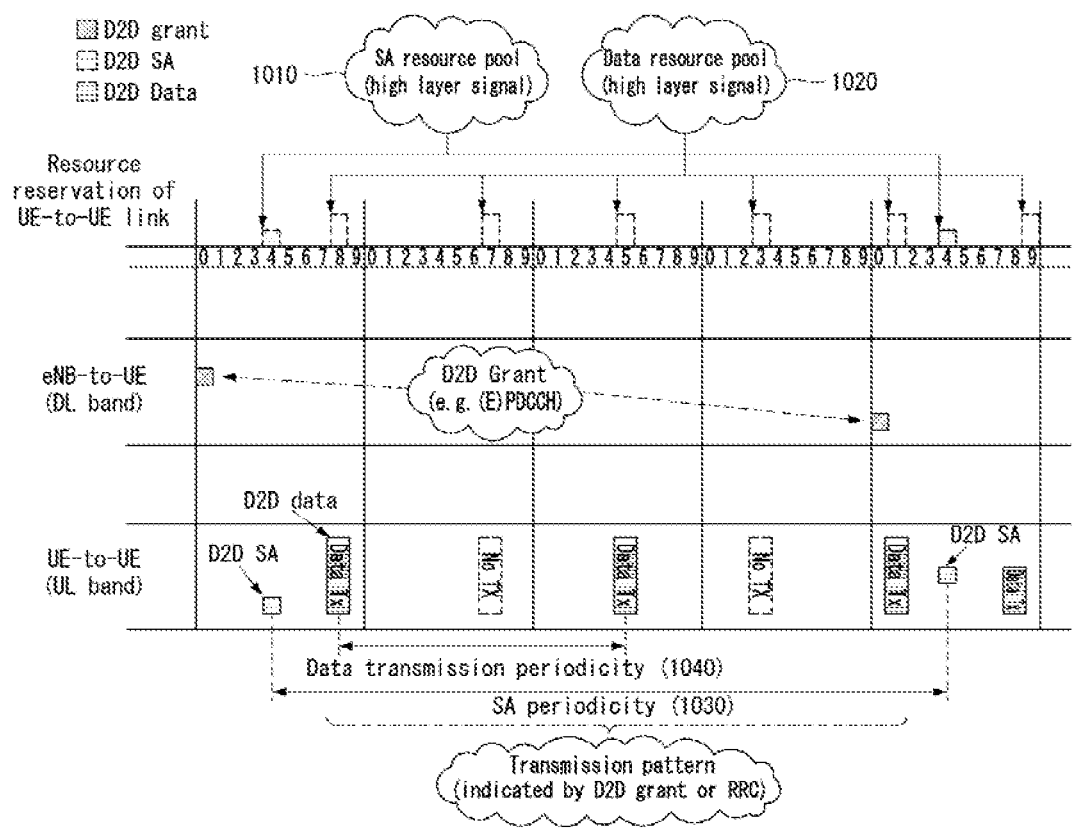

[FIG. 11]
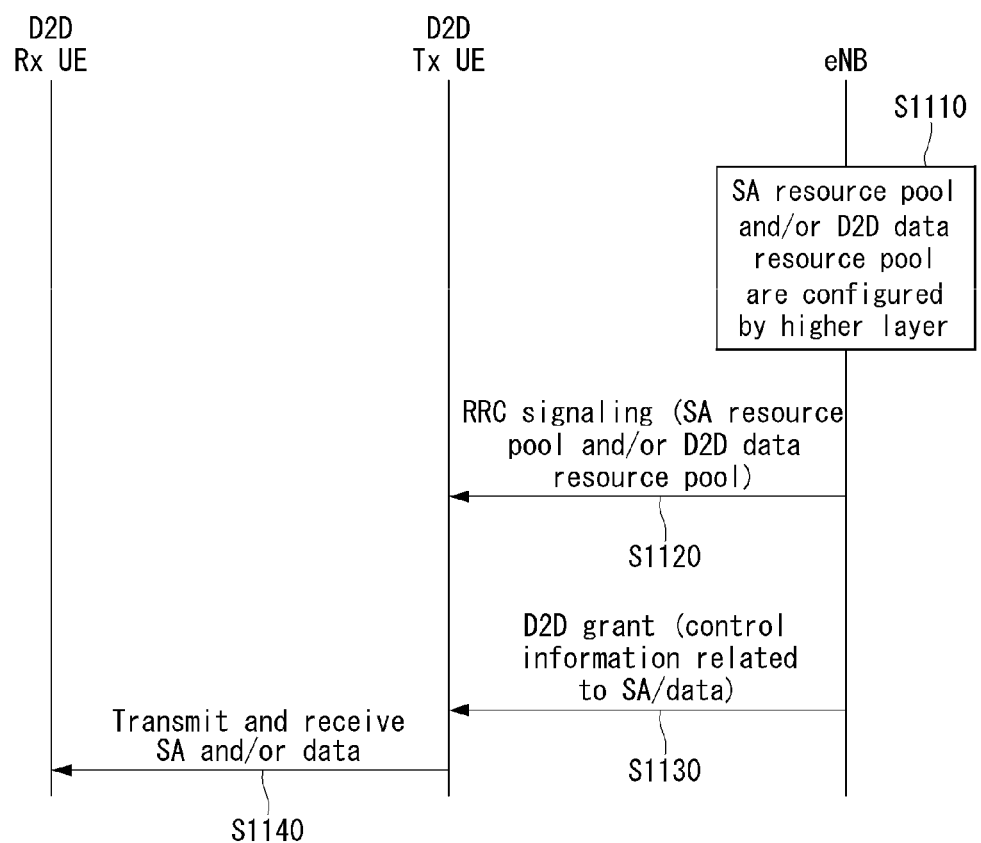

[FIG. 12]
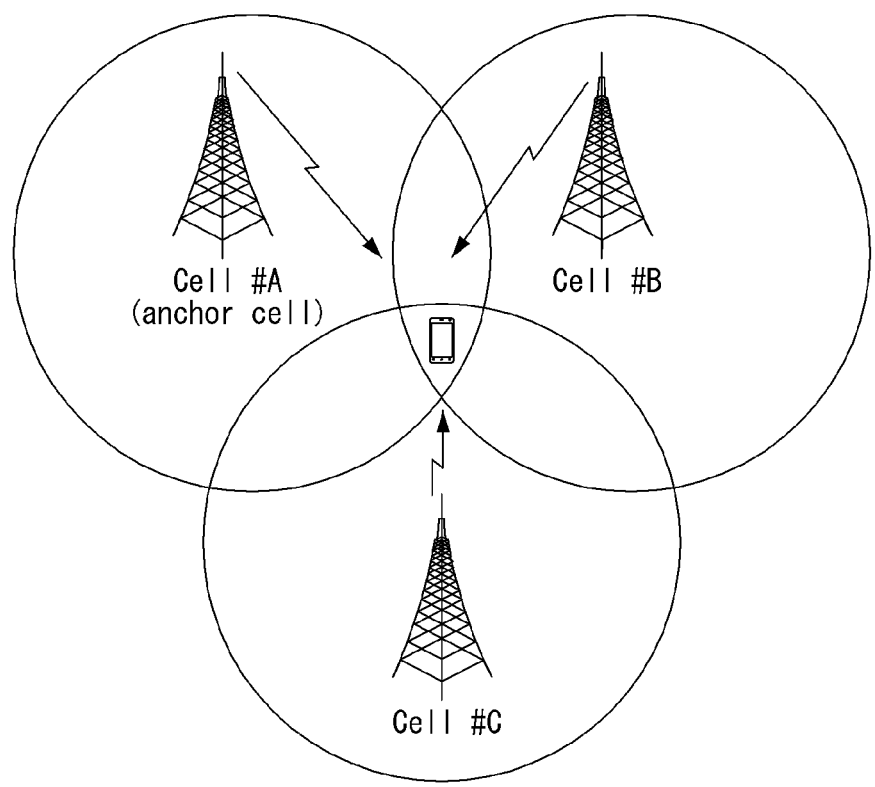

[FIG. 13]
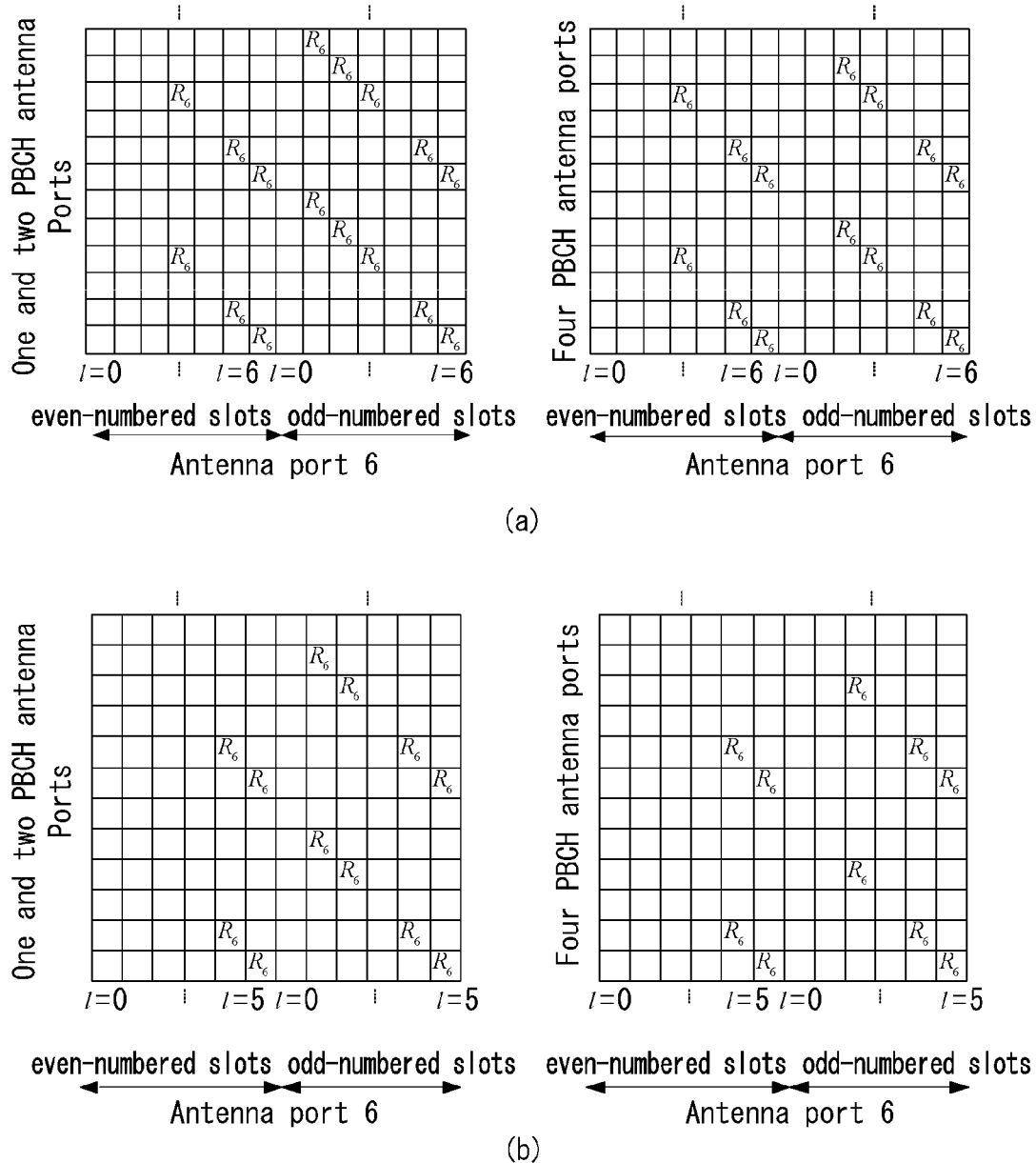

[FIG. 14]
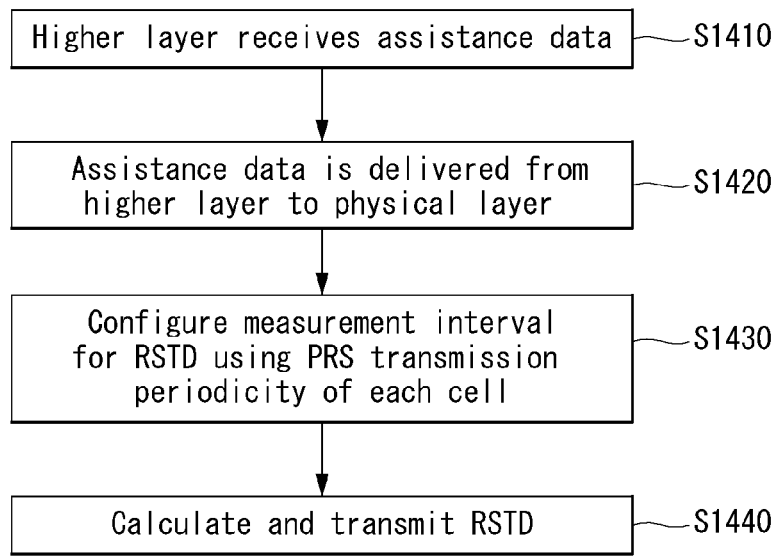
[FIG. 15]
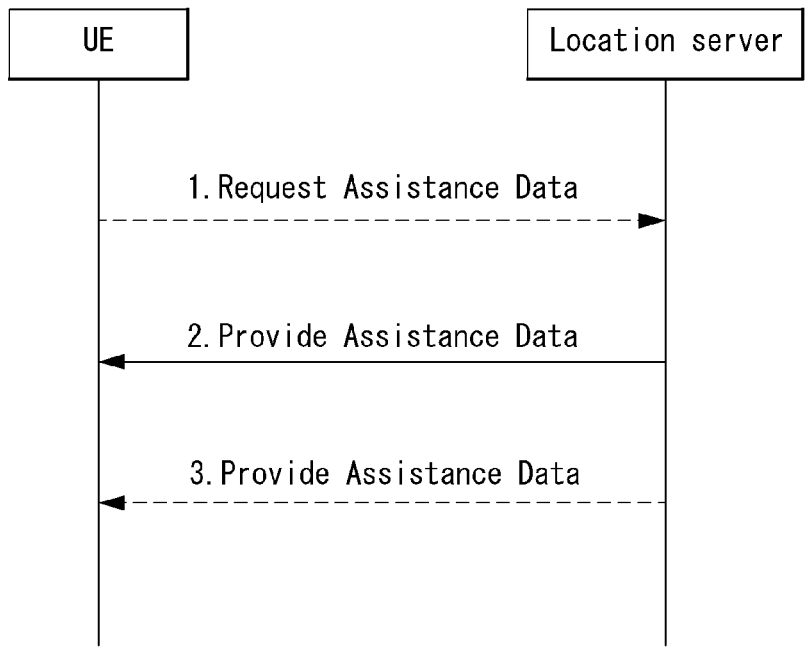

[FIG. 16]
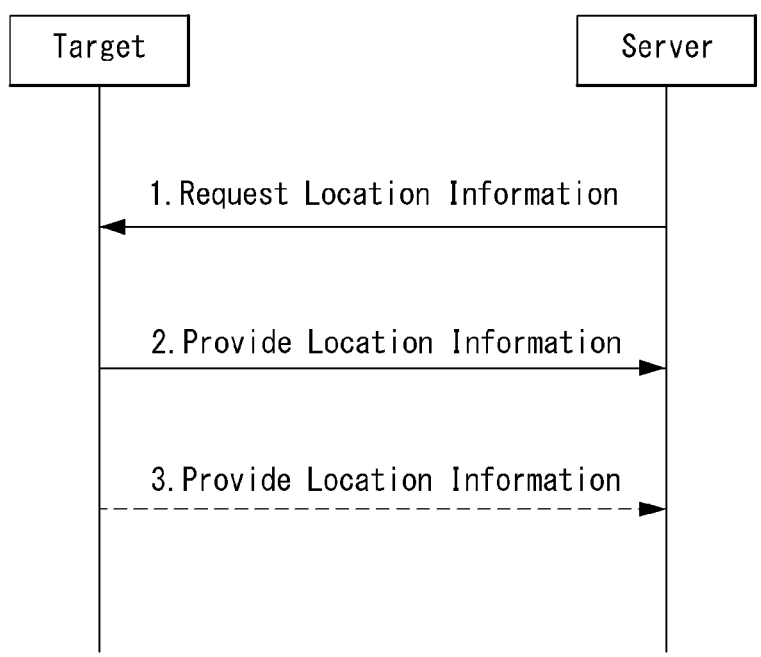

[FIG. 17]
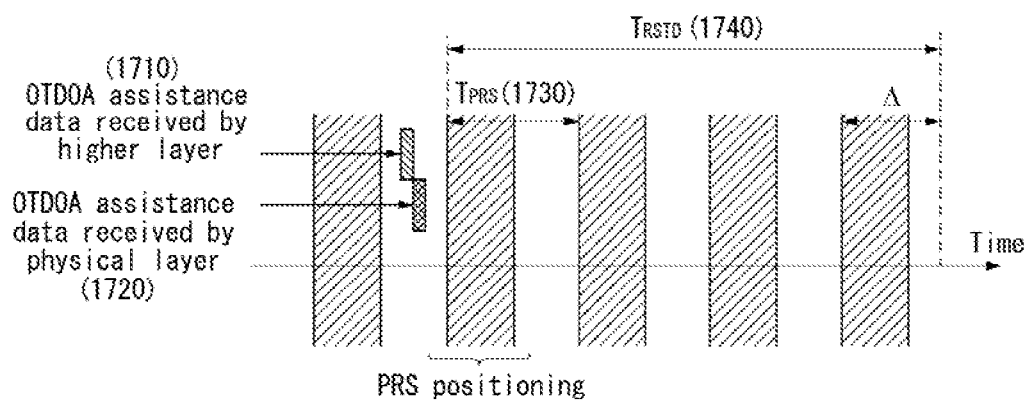

[FIG. 18]
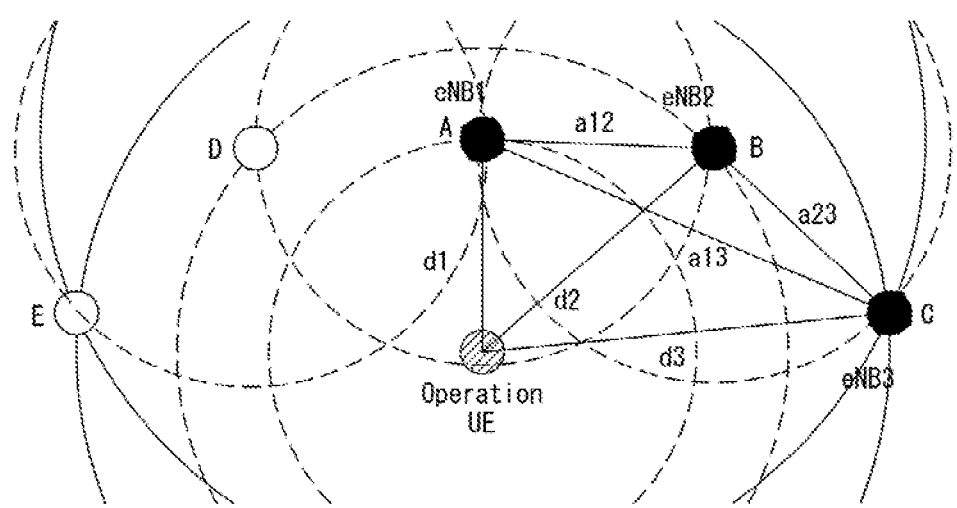

[FIG. 19]
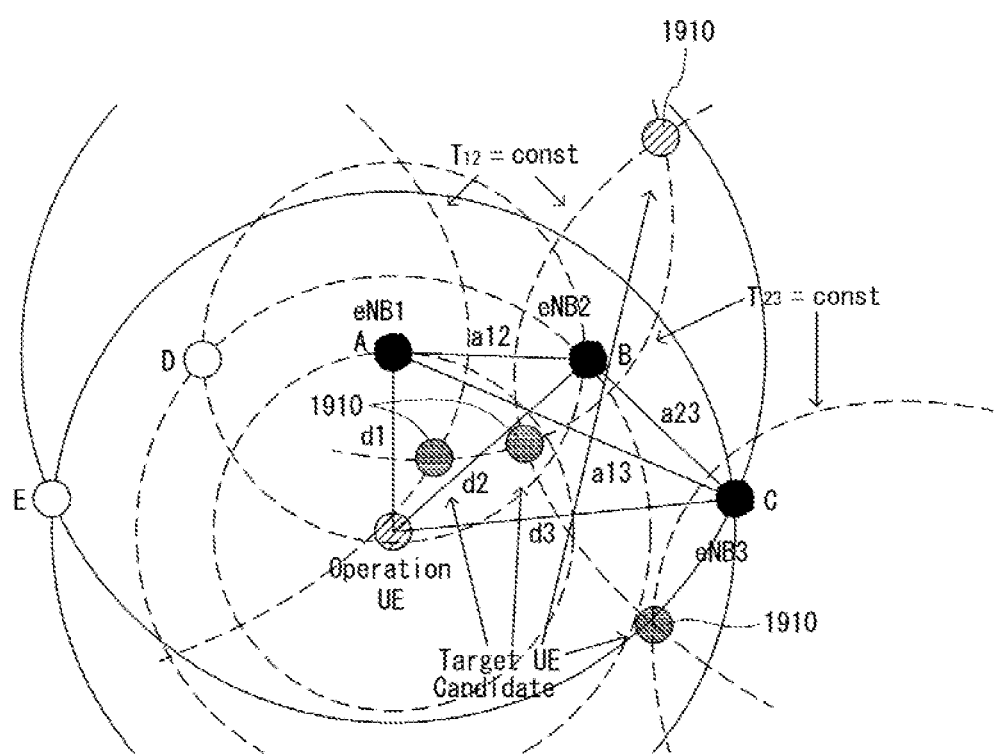

[FIG. 20]
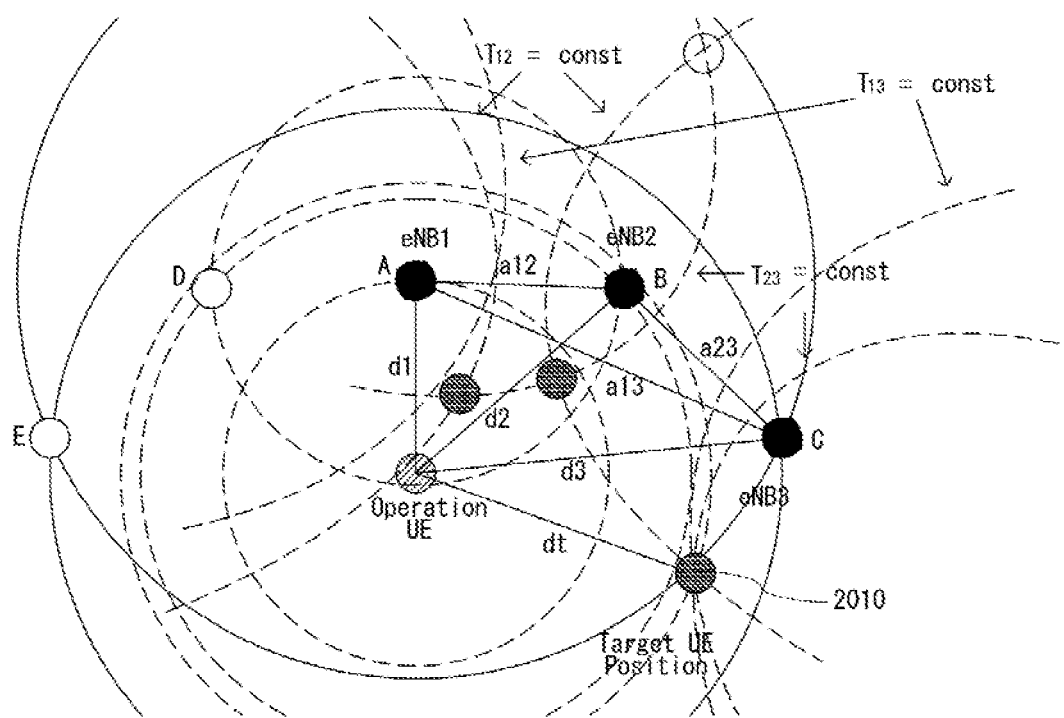

[FIG. 21]
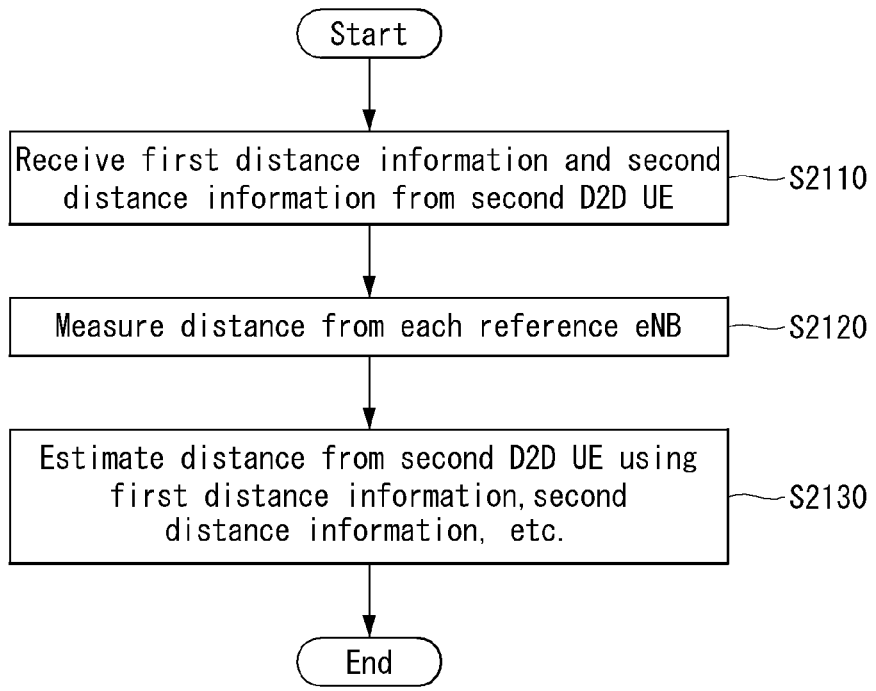
[FIG. 22]
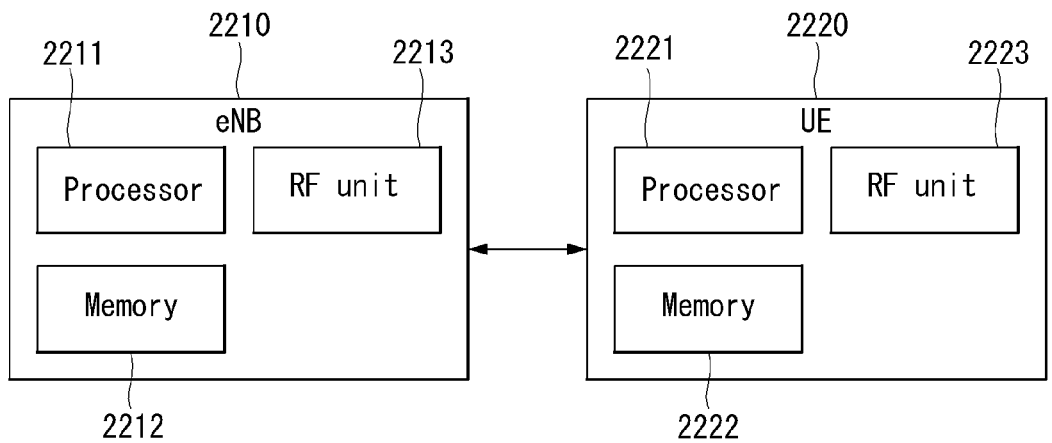

METHOD FOR ESTIMATING DISTANCE BETWEEN D2D TERMINALS AND APPARATUS FOR METHOD IN WIRELESS COMMUNICATION SYSTEM

CROSS-REFERENCE TO RELATED APPLICATIONS

This application is the National Stage filing under 35 U.S.C. 371 of International Application No. PCT/KR2016/014928, filed on Dec. 20, 2016, which claims the benefit of U.S. Provisional Application No. 62/327,389, filed on Apr. 25, 2016, the contents of which are all hereby incorporated by reference herein in their entirety.

TECHNICAL FIELD

The present invention relates to a wireless communication system and, more particularly, to a method of estimating the distance between device-to-device (D2D) UEs and an apparatus supporting the same.

BACKGROUND ART

A mobile communication system has been developed to provide voice services while ensuring the activity of a user. However, the mobile communication system has been expanded to its region up to data services in addition to the voice. Today, the shortage of resources is caused due to an explosive increase of traffic, and thus there is a need for a more advanced mobile communication system because users require higher speed services.

Requirements for a next-generation mobile communication system basically include the accommodation of explosive data traffic, a significant increase of a transfer rate per user, the accommodation of the significantly increased number of connection devices, very low end-to-end latency, and high energy efficiency. To this end, research is carried out on various technologies, such as dual connectivity, massive multiple input multiple output (MIMO), in-band full duplex, non-orthogonal multiple access (NOMA), super wideband support, and device networking.

DISCLOSURE

Technical Problem

An object of this specification is to provide a method of estimating the distance between a specific D2D UE to another D2D UE using information related to the distance that may be aware through a reference eNB and distance information between reference eNBs in a D2D environment.

Furthermore, an object of this specification is to provide a method of differently configuring transmission periodicity, a coding rate and transmit power of information used to estimate the distance between D2D UEs by taking into consideration the distance between the D2D UEs.

Technical objects to be achieved in the present invention are not limited to the aforementioned technical objects, and other technical objects not described above may be evidently understood by a person having ordinary skill in the art to which the present invention pertains from the following description.

Technical Solution

In this specification, a method of estimating the distance between device-to-device (D2D) UEs in a wireless communication system is performed by a first D2D UE, and includes receiving, from a second D2D UE, a specific message including first distance information related to a distance difference between the second D2D UE and at least three reference eNBs configured by the second D2D UE and second distance information indicating a distance between the at least three reference eNBs; measuring a distance between the reference eNBs; and estimating a distance from the second D2D UE using the measured distances between the reference eNBs, the first distance information and the second distance information.

Furthermore, in this specification, the first distance information is determined based on reference signals (RS) transmitted by the respective reference eNBs.

Furthermore, in this specification, the reference signal includes a positioning reference signal (PRS).

Furthermore, in this specification, the first distance information includes a reference signal time difference (RSTD) indicating a difference between times of the reference signals transmitted by the respective reference eNBs.

Furthermore, in this specification, the first D2D UE indicates an operation UE, that is, the subject of distance estimation between the D2D UEs, and the second D2D UE is a target UE whose distance is to be estimation between the D2D UEs.

Furthermore, in this specification, estimating the distance from the second D2D UE includes determining a candidate point where the second D2D UE may be positioned based on the second distance information and determining the position of the second D2D UE using the first distance information at the determined candidate point.

Furthermore, in this specification, determining the candidate point includes forming a circle using a distance between the reference eNBs as a radius and a position of each reference eNB as a center.

Furthermore, in this specification, determining the position of the second D2D UE includes forming at least three hyperbolas based on the positions of two reference eNBs using the first distance information. The point where the formed at least three hyperbolas are met in common among the candidate points is determined as the position of the second D2D UE.

Furthermore, in this specification, the measured distance between the reference eNBs is measured using timing advance (TA) obtained through a random access procedure with each reference eNB or is measured using a positioning reference signal transmitted by each of the reference eNBs.

Furthermore, in this specification, at least one of transmission periodicity, a coding rate and transmit power is differently set in each of the first distance information and second distance information, received from the second D2D UE, depending on the distance from the second D2D UE.

Furthermore, in this specification, the specific message includes a D2D discovery signal or D2D data.

Furthermore, in this specification, a first device-to-device (D2D) user equipment (UE) for estimating a distance between D2D UEs in a wireless communication system includes a radio frequency (RF) unit for transmitting and receiving radio signals and a processor functionally connected to the RF unit. The processor is configured to control to receive, from a second D2D UE, a specific message including first distance information related to a distance difference between the second D2D UE and at least three reference eNBs configured by the second D2D UE and second distance information indicating a distance between the at least three reference eNBs, to measure a distance between the reference eNBs, and to estimate a distance from the second D2D UE using the measured distances between the reference eNBs, the first distance information and the second distance information.

Advantageous Effects

This specification has an effect in that various services can be provide for each corresponding distance because one D2D UE can estimate a distance up to a nearby specific D2D UE in a D2D environment.

Effects which may be obtained in the present invention are not limited to the aforementioned effects, and other technical effects not described above may be evidently understood by a person having ordinary skill in the art to which the present invention pertains from the following description.

DESCRIPTION OF DRAWINGS

The accompanying drawings, included as part of the detailed description in order to help understanding of the present invention, provide embodiments of the present invention and describe the technical characteristics of the present invention along with the detailed description.

FIG. 1 shows an example of a network structure of an evolved universal terrestrial radio access network (E-UTRAN) to which the present invention may be applied.

FIG. 2 is a diagram for illustrating physical channels used in a 3GPP LTE/LTE-A system to which the present invention may be applied and a common signal transmission method using the physical channels.

FIG. 3 shows the structure of a radio frame in a wireless communication system to which the present invention may be applied.

FIG. 4 is a diagram illustrating a resource grid for one downlink slot in a wireless communication system to which the present invention may be applied.

FIG. 5 shows the structure of a downlink subframe in a wireless communication system to which the present invention may be applied.

FIG. 6 shows the structure of an uplink subframe in a wireless communication system to which the present invention may be applied.

FIG. 7 is a diagram for conceptually illustrating D2D communication in a wireless communication system to which the present invention may be applied.

FIG. 8 shows an example of various scenarios for D2D communication to which a method proposed in this specification may be applied.

FIG. 9 is a diagram for illustrating a distributive discovery resource allocation method in a wireless communication system to which the present invention may be applied.

FIG. 10 is a diagram for illustrating a signaling transmission and reception method for D2D direct communication in a wireless communication system to which the present invention may be applied.

FIG. 11 is a diagram for illustrating a downlink control information transmission method for D2D direct communication in a wireless communication system to which the present invention may be applied.

FIG. 12 is a diagram illustrating an OTDOA method for determining the location of a UE.

FIG. 13 is a diagram showing a pattern in which a PRS has been assigned to a resource element.

FIG. 14 is a flowchart showing an example of a method of determining the location of a UE.

FIG. 15 is a diagram showing a process for a UE to receive assistance data by requesting the assistance data from a base station.

FIG. 16 is a diagram showing a method of transmitting location information.

FIG. 17 is a diagram showing a process of forwarding assistance data to a physical layer and configuring a measurement interval for an RSTD using a PRS period.

FIG. 18 is a diagram showing an example of a first step of estimating the distance between D2D UEs, which is proposed in this specification.

FIG. 19 is a diagram showing an example of a second step of estimating the distance between D2D UEs, which is proposed in this specification.

FIG. 20 is a diagram showing an example of a third step of estimating the distance between D2D UEs, which is proposed in this specification.

FIG. 21 is a flowchart showing an example of a method of estimating the distance between D2D UEs, which is proposed in this specification.

FIG. 22 illustrates the block configuration of a wireless communication apparatus to which a method proposed in this specification may be applied.

MODE FOR INVENTION

Hereinafter, preferred embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and device.

In this specification, a base station has the meaning of a terminal node of a network, which directly performs communication with a terminal. In this document, a specific operation that is illustrated as being performed by a base station may be performed by an upper node of a base station according to circumstances. That is, it is evident that in a network consisting of a plurality of network nodes including a base station, various operations performed for communication with a terminal may be performed by a base station or other network nodes other than the base station. A "base station (BS)" may be substituted with a term, such as a fixed station, a Node B, an evolved-NodeB (eNB), a base transceiver system (BTS) or an access point (AP). Furthermore, a "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device or a device-to-device (D2D) device.

Hereinafter, downlink (DL) means communication from a base station to a UE, and uplink (UL) means communication from a UE to a base station. In the downlink, a transmitter may be part of a base station, and a receiver may be part of a UE. In the uplink, a transmitter may be part of a UE, and a receiver may be part of a base station.

Specific terms used in the following description have been provided to help understanding of the present invention. The use of such specific terms may be changed into a different type without departing from the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as radio technologies, such as IEEE 802.11 (Wi-Fi), IEEE 802.16 (WiMAX), IEEE 802-20, and evolved UTRA (E-UTRA). UTRA is part of a universal mobile telecommunications system (UMTS). 3$^{rd}$ generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by standard documents disclosed in at least one of IEEE 802, 3GPP and 3GPP2, that is, radio access systems. That is, steps or parts not described in order to clearly describe the technical spirit of the present invention in embodiments of the present invention may be supported by the documents. Furthermore, all of terms disclosed in this document may be described by the standard document.

For the clarity of description, 3GPP LTE/LTE-A is chiefly described, but the technical characteristics of the present invention are not limited thereto.

General System

FIG. 1 shows an example of a network structure of an evolved universal terrestrial radio access network (E-UTRAN) to which the present invention may be applied.

The E-UTRAN system is a system evolved from the existing UTRAN system and may be a 3GPP LTE/LTE-A system, for example. The E-UTRAN includes eNBs providing a UE with control plane and user plane protocols. The eNBs are connected through an X2 interface. An X2 user plane interface (X2-U) is defined between the eNBs. The X2-U interface provides the non-guaranteed delivery of a user plane packet data unit (PDU). An X2 control plane interface (X2-CP) is defined between two adjacent eNBs. The X2-CP performs functions, such as context delivery between eNBs, control of a user plane tunnel between a source eNB and a target eNB, the delivery of a handover-related message, and uplink load management. An eNB is connected to a UE through a radio interface and is connected to an evolved packet core (EPC) through an S1 interface. An S1 user plane interface (S1-U) is defined between the eNB and a serving gateway (S-GW). An S1 control plane interface (S1-MME) is defined between the eNB and a mobility management entity (MME). The S1 interface performs an evolved packet system (EPS) bearer service management function, a non-access stratum (NAS) signaling transport function, network sharing, and an MME load balancing function. The S1 interface supports a many-to-many-relation between the eNB and the MME/S-GW.

FIG. 2 is a diagram for illustrating physical channels used in a 3GPP LTE/LTE-A system to which the present invention may be applied and a common signal transmission method using the physical channels.

A UE that is powered on again in the state in which the UE has been powered off or that has newly entered a cell performs an initial cell search task, such as establishing synchronization with a base station at step S201. To this end, the UE receives a primary synchronization channel (P-SCH) (or a primary synchronization signal (PSS)) and a secondary synchronization channel (S-SCH) (or a secondary synchronization signal (SSS)) from the base station, establishes synchronization with the base station, and obtains information, such as a cell identifier (ID).

Thereafter, the UE may obtain broadcast information within a cell by receiving a physical broadcast channel (PBCH) signal from the base station. Meanwhile, the UE may check a downlink channel state by receiving a downlink reference signal (DL RS) in the initial cell search step.

The UE that has finished the initial cell search may obtain detailed system information by receiving a PDCCH and a PDSCH according to PDCCH information at step S202.

Thereafter, the UE may perform a random access procedure, such as steps S203 to S206, in order to complete access to the base station. To this end, the UE may transmit a preamble through a physical random access channel (PRACH) (S203), and may receive a response message for the preamble through a PDCCH and a PDSCH corresponding to the PDCCH (S204). In the case of contention-based random access, the UE may perform a contention resolution procedure, such as the reception of an additional PRACH signal (S205) and the reception of a PDCCH signal and a corresponding PDSCH signal (S206).

The UE that has performed the aforementioned procedure may perform the reception of a PDCCH signal and/or a PDSCH signal (S207) and the transmission of a physical uplink shared channel (PUSCH) signal and/or a physical uplink control channel (PUCCH) signal (S208) as a common uplink/downlink signal transport procedure.

Control information transmitted from a UE to a base station is collectively called uplink control information (UCI). The UCI includes HARQ-ACK/NACK, a scheduling request (SR), a channel quality indicator (CaI), a precoding matrix indicator (PMI), and rank indication (RI) information.

In the LTE/LTE-A system, in general, UCI is periodically transmitted through a PUCCH. If control information and traffic data need to be transmitted at the same time, the control information may be transmitted through a PUSCH. Furthermore, UCI may be aperiodically transmitted through a PUSCH in response to a request/indication from a network.

FIG. 3 is a diagram showing the structure of a radio frame used in a 3GPP LTE system to which the present invention can be applied.

The 3GPP LTE standard supports a type-1 radio frame structure applicable to frequency division duplex (FDD) and a type-2 radio frame structure applicable to time division duplex (TDD).

FIG. 3(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain.

In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

FIG. 3(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 4 shows an example of a resource grid for one downlink slot in the wireless communication system to which the present invention can be applied.

Referring to the FIG. 4, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, ..., NRB×12−1) denotes an index of subcarrier in the frequency domain, and l(l=0, ..., 6) denotes an index of symbol in the time domain. The number NDL of resource blocks included in the downlink slot depends on a downlink transmission bandwidth determined in a cell.

FIG. 5 shows a structure of a downlink subframe in the wireless communication system to which the present invention can be applied.

Referring to the FIG. 5, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 6 shows a structure of an uplink subframe in the wireless communication system to which the present invention can be applied.

Referring to the FIG. 6, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Device-to-Device (D2D) Communication

A device-to-device (D2D) communication technology refers to a method for geographically adjacent UEs to directly communicate with each other without the intervention of infra, such as a base station.

As the D2D communication technology, a technology chiefly using a non-licensed frequency band, such as Wi-Fi Direct and Bluetooth that have already been commercialized, has been developed. However, in order to improve frequency use efficiency of a cellular system, D2D communication technology development and standardization using a licensed frequency band are in progress.

In general, D2D communication is limitedly used as a term that refers to communication between things or thing intelligence communication. However, D2D communication in the present invention may include all of types of communication between various types of devices having a communication function, such as a smartphone and a personal computer, in addition to a simple device having a communication function.

FIG. 7 is a diagram for conceptually illustrating D2D communication in a wireless communication system to which the present invention may be applied.

FIG. 7(a) shows the existing communication method based on an eNB. A UE 1 may transmit data to the eNB in the uplink. The eNB may transmit data to a UE 2 in the downlink. Such a communication method may be called an indirect communication method through an eNB. In the indirect communication method, an Un link, that is, a link defined in the existing wireless communication system (a link between eNBs or a link between an eNB and a relay, which may be called a backhaul link) and/or an Uu link (a link between an eNB and a UE or a link between a relay and a UE, which may be called an access link) may be related.

FIG. 7(b) is an example of D2D communication and shows a UE-to-UE communication method. The exchange of data between UEs may be performed without the intervention of an eNB.

Such a communication method may be called a D2D direct communication method. The D2D direct communication method has advantages in that latency is reduced compared to the existing indirect communication method through an eNB and less radio resources are used.

FIG. 8 shows an example of various scenarios for D2D communication to which a method proposed in this specification may be applied.

Scenarios for D2D communication may be basically divided into (1) an Out-of-Coverage Network, (2) a Partial-Coverage Network and (3) an In-Coverage Network depending on whether a UE 1 and a UE 2 are located in cell in-coverage/cell out-of-coverage.

The In-Coverage Network may be divided into an In-Coverage-Single-Cell and an In-Coverage-Multi-Cell depending on the number of cells corresponding to coverage of a base station.

FIG. 8(a) shows an example of an Out-of-Coverage Network scenario for D2D communication.

The Out-of-Coverage Network scenario means that D2D UEs perform D2D communication without control of a base station.

From FIG. 8(a), it may be seen that only the UE 1 and the UE 2 are present and the UE 1 and the UE 2 perform direct communication.

FIG. 8(b) shows an example of a Partial-Coverage Network scenario for D2D communication.

The Partial-Coverage Network scenario means that a D2D UE located in network in-coverage and a D2D UE located in network out-of-coverage perform D2D communication.

From FIG. 8(b), it may be seen that a UE 1 located in network in-coverage and a UE 1 located in network out-of-coverage communicate with each other.

FIG. 8(c) shows an example of an In-Coverage-Single-Cell scenario, and FIG. 8(d) shows an example of an In-Coverage-Multi-Cell scenario.

The In-Coverage Network scenario means that D2D UEs perform D2D communication through control of a base station in network in-coverage.

In FIG. 8(c), a UE 1 and a UE 2 are located in the same network coverage (or cell) and perform D2D communication under the control of a base station.

In FIG. 8(d), a UE 1 and a UE2 are located in network in-coverage, but are located in different types of network in-coverage. Furthermore, the UE 1 and the UE 2 perform D2D communication under the control of base stations that control different types of network coverage, respectively.

Hereinafter, D2D communication is described more specifically.

D2D communication may operate in the scenarios of FIG. 8, but in general, may operate in network in-coverage and network out-of-coverage. A link used for D2D communication (communication between UEs) may be called a D2D link or a direct link or a sidelink, but is collectively called a sidelink, for convenience of description.

Sidelink transmission may operate in an uplink spectrum in the case of FDD and may operate in an uplink (or downlink) subframe in the case of TDD. For the multiplexing of sidelink transmission and uplink transmission, time division multiplexing (TDM) may be used.

Sidelink transmission and uplink transmission do not occur at the same time. Sidelink transmission does not occur in an uplink subframe used for uplink transmission or a sidelink subframe that overlaps an UpPTS partially or fully.

Furthermore, the transmission and reception of a sidelink do not occur at the same time.

The structure of an uplink physical resource may be identically used as the structure of a physical resource used for sidelink transmission. In this case, the last symbol of a sidelink subframe includes a guard period and is not used for sidelink transmission.

The sidelink subframe may consist of an extended cyclic prefix (extended CP) or a normal cyclic prefix (normal CP).

D2D communication may be basically divided into discovery, direct communication, and synchronization.

(1) Discovery

D2D discovery may be applied in network in-coverage (including an inter-cell and an intra-cell). Both synchronous and asynchronous cell deployments may be taken into consideration in inter-cell discovery. D2D discovery may be used for various commercial purposes, such as advertising, the issue of coupons and finding friends, with respect to a UE within an adjacent area.

If a UE 1 has the role of discovery message transmission, the UE 1 transmits a discovery message, and a UE 2 receives the discovery message. The transmission and reception roles of the UE 1 and the UE 2 may be reversed. Transmission from the UE 1 may be received by one or more UE(s), such as the UE 2.

The discovery message may include a single MAC PDU. In this case, the single MAC PDU may include a UE identifier (ID) and an application identifier (ID).

A physical sidelink discovery channel (PSDCH) may be defined as a channel for transmitting the discovery message.

The structure of the PSDCH channel may reuse a PUSCH structure.

Two types (Type 1 and Type 2) may be used for a resource allocation method for D2D discovery.

In the case of Type 1, a base station may allocate a resource for discovery message transmission in a non-UE-specific manner.

Specifically, a radio resource pool for discovery transmission and reception, including a plurality of subframe sets and a plurality of resource block sets within a specific period (hereinafter a "discovery period") may be allocated. A discovery Tx UE randomly selects a specific resource within the radio resource pool and transmits a discovery message.

Such a periodic discovery resource pool may be allocated for discovery signal transmission in a semi-static manner. Configuration information of a discovery resource pool for discovery transmission includes a discovery period, a subframe set that may be used for the transmission of a discovery signal within the discovery period, and resource block set information. Such configuration information of a discovery resource pool may be transmitted to a UE through higher layer signaling. In the case of an In-coverage UE, a discovery resource pool for discovery transmission is configured by a base station, and the UE may be notified of the discovery resource pool using RRC signaling (e.g., a system information block (SIB)).

A discovery resource pool allocated for discovery within one discovery period may be TDM and/or FDM multiplexed as a time-frequency resource block having the same size. Such a time-frequency resource block having the same size may be called a "discovery resource."

The discovery resource may be classified in one subframe unit, and may include two physical resource blocks (PRBs)

per slot in each subframe. One discovery resource may be used for the transmission of a discovery MAC PDU by one UE.

Furthermore, a UE may repeatedly transmit a discovery signal within a discovery period for the transmission of one transport block. The transmission of a MAC PDU transmitted by one UE may be repeated (e.g., repeated four times) within a discovery period (i.e., a radio resource pool) continuously or non-contiguously. The number of times that a discovery signal for one transport block is transmitted may be transmitted to a UE through higher layer signaling.

A UE may randomly select a first discovery resource in a discovery resource set that may be used for the repeated transmission of a MAC PDU, and other discovery resources may be determined in relation to the first discovery resource. For example, a specific pattern may be pre-configured, and a next discovery resource may be determined according to a pre-configured pattern based on the location of a discovery resource first selected by a UE.

Furthermore, a UE may randomly select each discovery resource within a discovery resource set that may be used for the repeated transmission of a MAC PDU.

In Type 2, a resource for discovery message transmission is allocated in a UE-specific manner.

Type 2 is subdivided into Type-2A and Type-2B. Type-2A is a method for a base station to allocate a resource at each transmission instance of a discovery message within a discovery period. Type-2B is a method of allocating a resource using a semi-persistent method.

In the case of Type-2B, an RRC_CONNECTED UE requests the allocation of a resource for the transmission of a D2D discovery message from a base station through RRC signaling. Furthermore, the base station may allocate the resource through RRC signaling. When the UE makes transition to an RRC_IDLE state or when the base station withdraws resource allocation through RRC signaling, the UE releases the most recently allocated transmission resource. As described above, in the case of Type-2B, a radio resource may be allocated by RRC signaling, and the activation/deactivation of a radio resource allocated by a PDCCH may be determined.

A radio resource pool for discovery message reception is configured by a base station. A UE may be notified of the radio resource pool using RRC signaling (e.g., system information block (SIB)).

A discovery message Rx UE monitors all of the discovery resource pool of Type 1 and Type 2 for discovery message reception.

(2) Direct Communication

An area to which D2D direct communication is applied includes network edge-of-coverage in addition to network in-coverage and out-of-coverage. D2D direct communication may be used for a purpose, such as public safety (PS).

If a UE 1 has the role of direct communication data transmission, the UE 1 transmits direct communication data, and a UE 2 receives direct communication data. The transmission and reception roles of the UE 1 and the UE 2 may be reversed. Direct communication transmission from the UE 1 may be received by one or more UE(s), such as the UE 2.

D2D discovery and D2D communication are not associated and may be independently defined. That is, in groupcast and broadcast direct communication, D2D discovery is not required. If D2D discovery and D2D direct communication are independently defined as described above, UEs do not need to recognize an adjacent UE. In other words, in the case of groupcast and broadcast direct communication, all of Rx UEs within a group are not required to be adjacent to each other.

A physical sidelink shared channel (PSSCH) may be defined as a channel in which D2D direct communication data is transmitted. Furthermore, a physical sidelink control channel (PSCCH) may be defined as a channel in which control information for D2D direct communication (e.g., scheduling assignment (SA), a transport format, etc. for direct communication data transmission) is transmitted. The PSSCH and the PSCCH may reuse a PUSCH structure.

Two modes (Mode 1 and Mode 2) may be used as a resource allocation method for D2D direct communication.

Mode 1 refers to a method for a base station to schedule a resource used to transmit data or control information for D2D direct communication with respect to a UE. In-coverage, Mode 1 is applied.

A base station configures a resource pool for D2D direct communication. In this case, the resource pool for D2D communication may be divided into a control information pool and a D2D data pool. When a base station configures control information and a D2D data transmission resource within a configured pool with respect to a Tx D2D UE using a PDCCH or ePDCCH, the Tx D2D UE transmits control information and D2D data using the allocated resource.

A Tx UE requests a transmission resource from a base station. The base station schedules a resource for the transmission of control information and D2D direct communication data. That is, in the case of Mode 1, a Tx UE must be in the RRC_CONNECTED state in order to perform D2D direct communication. The Tx UE transmits a scheduling request to a base station. Next, a buffer status report (BSR) procedure is performed so that the base station can determine the amount of resources requested by the Tx UE.

Rx UEs monitor a control information pool. When an Rx UE decodes control information related thereto, it may selectively decode D2D data transmission related to the corresponding control information. The Rx UE may not decode a D2D data pool based on a result of control information decoding.

Mode 2 refers to a method for a UE to randomly select a specific resource in a resource pool in order to transmit data or control information for D2D direct communication. In out-of-coverage and/or edge-of-coverage, Mode 2 is applied.

In Mode 2, a resource pool for control information transmission and/or a resource pool for D2D direct communication data transmission may be pre-configured or may be semi-statically configured. A UE is provided with a configured resource pool (time and frequency) and selects a resource for D2D communication transmission within the resource pool. That is, the UE may select a resource for control information transmission in a control information resource pool in order to transmit control information. Furthermore, the UE may select a resource for a data resource pool for the transmission of D2D direct communication data.

In D2D broadcast communication, control information is transmitted by a broadcasting UE. The control information indicates the position of a resource for data reception explicitly and/or implicitly in relation to a physical channel (i.e., PSSCH) that carries D2D direct communication data.

(3) Synchronization

A D2D synchronization signal/sequence (D2DSS) may be used for a UE to obtain time-frequency synchronization. In particular, in the case of network out-of-coverage, a new signal and procedure for synchronization establishment between UEs may be defined because control of a base station is impossible. The D2D synchronization signal may refer to a sidelink synchronization signal.

A UE that periodically transmits a D2D synchronization signal may be called a D2D synchronization source or a sidelink synchronization source. If a D2D synchronization source is a base station, the structure of a transmitted D2D synchronization signal may be the same as a PSS/SSS. If a D2D synchronization source is not a base station (e.g., a UE or a global navigation satellite system (GNSS)), the structure of a transmitted D2D synchronization signal may be newly defined.

A D2D synchronization signal is periodically transmitted in a period not smaller than 40 ms.

Each UE may have multiple physical-layer D2D synchronization identities. The physical-layer D2D synchronization identity may be called a physical-layer sidelink synchronization identity or simply a D2D synchronization identity.

A D2D synchronization signal includes a D2D primary synchronization signal/sequence and a D2D secondary synchronization signal/sequence. They may be called a primary sidelink synchronization signal (PSSS) and a secondary sidelink synchronization signal (SSSS).

Before a UE transmits a D2D synchronization signal, the UE may search for a D2D synchronization source. Furthermore, when the D2D synchronization source is searched for, the UE may obtain time-frequency synchronization through a D2D synchronization signal received from the discovered D2D synchronization source. Furthermore, the corresponding UE may transmit a D2D synchronization signal.

Furthermore, a channel having an object of delivering system information used for communication between UEs along with synchronization and synchronization-related information may be necessary. A channel for such a purpose may be defined. Such a channel may be called a physical D2D synchronization channel (PD2DSCH) or a physical sidelink broadcast channel (PSBCH).

Hereinafter, for a clarity purpose, in D2D communication, direct communication between two devices is described as an example, but the scope of the present invention is not limited thereto. The same principle described in the present invention may be applied to D2D communication between a plurality of two or more devices.

D2D Discovery

Hereinafter, a signal (or message) periodically transmitted by UEs for D2D discovery may be called a discovery message, a discovery signal, a beacon or the like. Hereinafter, they are collectively called a discovery message, for convenience of description.

In distributive discovery, a dedicated resource may be periodically allocated as a resource that is used for a UE to transmit and receive a discovery message separately from a cellular resource.

This is described below with reference to FIG. 9.

FIG. 9 is a diagram for illustrating a distributive discovery resource allocation method in a wireless communication system to which the present invention may be applied.

Referring to FIG. 9, in the distributive discovery method, a discovery subframe for discovery (i.e., a "discovery resource pool") 901 among all of cellular uplink frequency-time resources is fixedly (or dedicatedly allocated. The remaining areas include the existing LTE uplink wide area network (WAN) subframe area 902. The discovery resource pool may include one or more subframes.

The discovery resource pool may be periodically allocated at a specific time interval (i.e., a "discovery period").

Furthermore, the discovery resource pool may be repeatedly configured within one discovery period.

FIG. 9 shows an example in which discovery resource pools are allocated with a discovery period of 10 seconds and 64 continuous subframes are allocated to each discovery resource pool. In this case, the sizes of the time/frequency resource of the discovery period and discovery resource pool correspond to examples, and the present invention is not limited thereto.

A UE selects a resource (i.e., "discovery resource") for transmitting its own discovery message within a dedicatedly allocated discovery pool, and transmits a discovery message through the selected resource.

D2D Direct Communication

D2D control information may be called sidelink control information (SCI) or scheduling assignment (SA). As described above, D2D control information may be transmitted on a PSCCH, and D2D data may be transmitted on a PSSCH. Hereinafter, D2D control information is called SA.

FIG. 10 is a diagram for illustrating a signaling transmission and reception method for D2D direct communication in a wireless communication system to which the present invention may be applied.

FIG. 10 shows a method of performing a D2D operation procedure in a D2D operation procedure (D2D communication Mode 1) under the control of a base station and D2D communication by transmitting and receiving related information.

As shown in FIG. 10, a scheduling assignment (SA) resource pool 1010 and/or a data resource pool 1020 related to D2D communication may be previously configured. The previously configured resource pool may be transmitted from a base station to D2D UEs through higher layer signaling.

The higher layer signaling may be RRC signaling.

An expression of "A and/or B" used in this specification may be interpreted as a concept that means at least one (indicate A, B or A&B) of A and B.

The SA resource pool and/or the data resource pool may mean a resource reserved for a UE-to-UE line (D2D: UE-to-UE) or D2D communication.

The UE-to-UE link may be represented as a sidelink.

Specifically, the SA resource pool means a resource pool in which SA may be transmitted. The data resource pool means a resource pool in which D2D data may be transmitted.

The SA may be transmitted in SA periodicity 1030. D2D data may be transmitted in data transmission periodicity 1040.

The SA periodicity and/or the data transmission periodicity may be transmitted from a base station to a D2D UE through a D2D grant.

Alternatively, the SA periodicity may be transmitted through a D2D grant, and the data transmission periodicity may be transmitted through SA.

In this case, the D2D grant indicates SA transmitted from a base station to a D2D UE and downlink control information (DCI) necessary for D2D data transmission.

The D2D grant may be represented as a DCI format 5, and may be transmitted through a physical layer channel, such as a PDCCH or an EPDCCH, or a MAC layer channel.

Furthermore, the D2D grant may include information related to data transmission in addition to information related to SA transmission.

The SA may include resource allocation (RA), an MCS, a new data indicator (NDI), a redundancy version (RV), etc. for example.

As described above, the SA resource pool for SA transmission may be transmitted through RRC signaling.

Furthermore, the SA may be transmitted through a physical sidelink control channel (PSCCH). The D2D data may be transmitted through a physical sidelink shared channel (PSSCH).

A D2D Tx UE may receive SA information, in particular, resource allocation (RA) information (hereinafter called "SA RA" information) in which SA may be transmitted through a D2D grant from a base station.

In this case, the D2D Tx UE may transmit SA RA information, received from a base station, to a D2D Rx UE without any change or may generate new SA RA information with reference to the received SA RA information and transmit the newly generated SA RA information to the D2D Rx UE.

In this case, if the D2D Tx UE newly generates SA RA, the D2D Tx UE needs to perform the resource allocation of SA only within a resource pool indicated by a D2D grant RA.

That is, this indicates that only some resource pool (SA RA) is selected from a resource pool (D2D grant RA) permitted to be used by an eNB and SA may be transmitted.

Alternatively, inversely, a D2D Tx UE may use a D2D grant RA assigned by an eNB without any change.

FIG. 11 is a diagram for illustrating a downlink control information transmission method for D2D direct communication in a wireless communication system to which the present invention may be applied.

First, an SA resource pool and/or D2D data resource pool related to D2D communication are configured by a higher layer (S1110).

Thereafter, an eNB transmit the SA resource pool and/or the D2D data resource pool to a D2D Tx UE through higher layer signaling (S1120).

Thereafter, the eNB transmits control information related to SA and/or control information related to D2D data to the D2D Tx UE, separately or together, through a D2D grant (S1130).

The control information includes scheduling information of SA and/or D2D data in the SA resource pool and/or D2D data resource pool. For example, the control information may include RA, an MCS, an NDI, an RV, etc.

Thereafter, the D2D Tx UE transmits SA and/or D2D data to a D2D Rx UE based on the information received at step S1130 (S1140).

The SA transmission and the transmission of the D2D data may be performed together or the transmission of the D2D data may be performed after the SA transmission.

Meanwhile, although not shown in FIG. 11, the D2D Tx UE may request a transmission resource (i.e., PSSCH resource) for the D2D data from the eNB. The eNB may schedule SA and a resource for D2D data transmission.

To this end, the D2D Tx UE transmits a scheduling request (SR) to the eNB. Next, a buffer status report (BSR) procedure may be performed so that the eNB can determine the amount of resources requested by the D2D Tx UE.

In this case, the SR is an SR for requesting PSSCH resource allocation not a PUSCH resource, and may be different from an SR for a PUSCH resource request.

To this end, in order to distinguish between an SR for a PSSCH and an SR for a PUSCH, for a PUCCH resource index (i.e., a PRB in which an SR is transmitted) and the frequency domain spread of an SR, a combination of a cyclic shift (CS) applied to a default sequence (e.g., ZC sequence) and an orthogonal code (OC) for the time domain spread of an SR may be differently configured.

When D2D Rx UEs monitor a control information pool and decodes control information related thereto, they may selectively decode D2D data transmission related to the corresponding control information.

As described above, a D2D grant functions to deliver resource allocation necessary for SA and data transmission by a D2D Tx UE, control information such as an MCS, that is, scheduling information.

Furthermore, since an SCI is used for the scheduling of a PSSCH from the viewpoint of a D2D Tx UE and D2D Rx UE, a DCI format for a D2D grant proposed in the present invention is used for the scheduling of a PSCCH, and may include field information of the SCI.

A DCI format for a D2D grant (or sidelink grant), as described above, includes scheduling information for SA and data, but a resource allocation/allocation (RA) field (or information) for SA and an RA field (or information) for data may be distinguished.

For example, a DCI format for a D2D grant may include a frequency hopping flag (FH) field, a resource allocation (RA) field for D2D SA, a first RA field for D2D data, a second RA field for D2D data, a TPC field, and a zero padding (ZP) bit(s) (if present).

The FH field indicates whether frequency hopping is applied when SA and data transmission is performed. The FH field may include one field because it may be applied to SA transmission and data transmission in common.

For example, when an FH field value is "1", a D2D Tx UE performs frequency hopping transmission upon SA and data transmission. When an FH field value is "0", a D2D Tx UE does not perform frequency hopping transmission upon SA and data transmission.

An SA RA field (or PSCCH RA field or a resource field for a PSCCH) indicates resource information for SA transmission. That is, this indicates scheduling information (i.e., resource information) for PSCCH transmission. Accordingly, a D2D Tx UE transmits SA (i.e., PSCCH) in a resource indicated in an SA RA field.

In this case, the SA RA field may include information (or index) for deriving the location of a time and/or frequency resource pool for SA transmission.

For example, the SA RA field may provide notification of the start location (i.e., index) of a resource for SA transmission. In other words, the SA RA field may indicate the start index of a subframe and/or resource block in which SA is transmitted.

Furthermore, a D2D Tx UE may derive a time resource (e.g., subframe index) and/or a frequency resource (e.g., resource block index) for SA transmission using a predetermined function (calculation equation) based on information included in an SA RA field.

Resource allocation information for D2D data transmission may include a D2D data first RA field (or a first PSSCH RA field, a resource block assignment and hopping resource allocation field) and a D2D data second RA field (or a second PSSCH RA field, a time resource pattern field).

The D2D data first RA field indicates resource information (e.g., a resource block) for D2D data transmission in the frequency domain. That is, the D2D data first RA field indicates scheduling information for PSSCH transmission in the frequency domain. Accordingly, a D2D Tx UE transmits D2D data (i.e., PSSCH) in a frequency resource indicated in the D2D data first RA field.

For example, the D2D data first RA field may indicate the start location (i.e., the start resource block index) of a resource block for D2D data transmission and the length of an allocated resource block using a resource indication value (RIV) as in an UL RA method.

Furthermore, the D2D data first RA field may provide notification of the start location (i.e., the start resource block index) and end location (i.e., the last resource block index) of a resource block for D2D data transmission as separate fields (or information). In this case, an additional bit (e.g., 1 bit) may be further necessary.

The D2D data second RA field indicates resource information (e.g., subframe) used for D2D data transmission in the time domain. That is, the D2D data second RA field indicates scheduling information for PSSCH transmission in the time domain. Accordingly, a D2D Tx UE transmits D2D data (i.e., PSSCH) in a time resource indicated in the D2D data second RA field.

For example, the D2D data second RA field may indicate a subframe pattern (i.e., time resource pattern) to be used for D2D data transmission. That is, the D2D data second RA field may include information indicating a time resource pattern used for PSCCH transmission.

In this case, the D2D data second RA field may indicate any one pattern of a plurality of predetermined time resource patterns. For example, n subframe patterns (represented as a bitmap), such as an SF pattern #0 (10001010), an SF pattern #1 (00111001), . . . , an SF pattern #n (10011001), may be previously defined. The D2D data second RA field may indicate any one subframe pattern of the defined n subframe patterns. In this case, the "1" value of the bitmap may mean that D2D data is transmitted in a corresponding subframe, the "0" value of the bitmap may mean that D2D data is not transmitted in a corresponding subframe, and the vice versa.

The TPC field indicates transmit power for SA and data transmission in a D2D Tx UE. That is, the TPC field indicates transmit power information of a PSCCH and a PSSCH.

The TPC field may include one field. As described above, if the TPC field includes one field, a value of the TPC field is applied to transmit power for SA and data transmission in common.

The ZP may be filled with control information or may not be used or may not be present as required. That is, if the ZP field is not necessary, it may be omitted.

Each field sequence of the illustrated DCI format and the number of bits of each field are only examples, for convenience of description, and may be changed.

Meanwhile, compared to the DCI format 0, the aforementioned DCI format for a D2D grant may not include a MCS field.

If an eNB notifies a D2D Tx UE of an MCS value, a MCS field must be present in a DCI format for a D2D grant. In this case, an MCS value may have been determined by a D2D Tx UE or may be delivered through higher layer signaling (e.g., RRC signaling) or may be determined as a previously fixed value. Accordingly, a MCS field may not be included in the D2D grant.

Furthermore, the aforementioned DCI format for a D2D grant may not include a NDI field and an RV field. Likewise, an NDI and an RV value may have been determined by a D2D Tx UE or may be delivered through higher layer signaling (e.g., RRC signaling) or may be determined as a previously fixed value.

Cell Measurement/Measurement Report

For one of multiple methods (handover, random access, and cell search) for the mobility guarantee of a UE or the multiple methods, a UE reports cell measurement results to an eNB (or network).

In the 3GPP LTE/LTE-A system, a cell-specific reference signal (CRS) is transmitted through a No. 0, 4, 7, 11 OFDM symbol within each subframe in the time axis, and this is basically used for cell measurement. That is, a UE performs cell measurement using CRSs received from a serving cell and a neighbor cell, respectively.

Cell measurement is a concept, including radio resource management (RRM) measurement, such as reference signal receive power (RSRP), a received signal strength indicator (RSSI) and reference signal received quality (RSRQ) in which signal intensity or total receive power of a serving cell and a neighbor cell versus signal intensity are measured, and radio link monitoring (RLM) measurement capable of evaluating a radio link failure by measuring link quality with a serving cell.

RSRP is a linear average of a power distribution of REs in which a CRS is transmitted within a measurement frequency band. In order to determine RSRP, a CRS(R0) corresponding to an antenna port "0" may be used. Furthermore, in order to determine RSRP, a CRS(R1) corresponding to an antenna port "1" may be additionally used. In order to determine RSRP, the number of REs used within a measurement frequency band and measurement interval used by a UE may be determined by a UE within the extent that corresponding measurement accuracy requirements are satisfied. Furthermore, power per RE may be determined from energy received within the remaining parts of a symbol other than a cyclic prefix (CP).

An RSSI is derived as a linear average of total receive power sensed from all of sources by a corresponding UE, including interference and thermal noise from a serving cell and non-serving cell of a co-channel and a neighbor channel in OFDM symbols including an RS corresponding to an antenna port "0" within a measurement band. If specific subframes for performing RSRQ measurement are indicated by higher layer signaling, an RSSI is measured through all of OFDM symbols within indicated subframes.

RSRQ is derived as an N×RSRP/RSSI. In this case, N means the number of RBs of an RSSI measurement bandwidth. Furthermore, the measurement of the denominator and numerator in the above equation may be performed in a set of the same RBs.

An eNB may deliver configuration information for measurement to a UE through higher layer signaling (e.g., RRC connection reconfiguration message).

The RRC connection reconfiguration message includes a radio resource configuration-dedicated ("radioResourceConfigDedicated") information element (IE) and a measurement configuration ("measConfig") IE.

The "measConfig" IE specifies measurement that must be performed by a UE, and includes configuration information for intra-frequency mobility, inter-frequency mobility and inter-RAT mobility in addition to the configuration of a measurement gap.

In particular, the "measConfig" IE includes "measObjectToRemoveList" indicating a list of measurement targets ("measObject") to be removed from measurement and "measObjectToAddModList" indicating a list to be newly added or modified. Furthermore, the "measObject" includes "MeasObjectCDMA2000", "MeasObjctEUTRA", and "MeasObjectGERAN" depending on a communication technology.

The "RadioResourceConfigDedicated" IE is used to setup/modify/release a radio bearer, change a MAC main configuration, change a semi-persistent scheduling (SPS) configuration and to change a dedicated physical configuration.

The "RadioResourceConfigDedicated" IE includes a "measSubframePattern-Serv" field indicating a time domain measurement resource restriction pattern for serving cell measurement. Furthermore, the "RadioResourceConfigDedicated" IE includes "measSubframeCellList" indicating a neighbor cell to be measured by a UE and "measSubframePattern-Neigh" indicating a time domain measurement resource restriction pattern for neighbor cell measurement.

A time domain measurement resource restriction pattern configured for a measurement cell (including a serving cell and a neighbor cell) may indicate at least one subframe per radio frame for performing RSRQ measurement. RSRQ measurement is not performed in subframes other than a subframe indicated by a time domain measurement resource restriction pattern configured for a measurement cell.

As described above, a UE (e.g., 3GPP Rel-10) must measure RSRQ in the period configured by a subframe pattern ("measSubframePattern-Serv") for serving cell measurement and a subframe pattern ("measSubframePattern-Neigh") for neighbor cell measurement.

In this case, RSRP is not restricted to measurement within such a pattern, but is preferably measured only within such a pattern for accuracy requirement.

Observed Time Difference of Arrival (OTDOA) Method

Hereinafter, the OTDOA method is described more specifically.

FIG. 12 is a diagram illustrating an OTDOA method for determining the location of a UE.

Referring to FIG. 12, a UE performs a reference clock based on a subframe transmitted in a current serving cell, and thus signals received from neighbor cells have different times of arrival (TOA).

The serving cell and the neighbor cell may be represented as a serving base station and an adjacent station, respectively.

That is, in the OTDOA method, a UE measures the location of the UE using a difference in the timing when signals transmitted by respective cells arrive at the UE. A reference cell is a cell, that is, a criterion for TDOA. The reference cell measures the time taken to receive a signal from one reference cell using reference signals or synchronization signals received from a plurality of neighbor cells and the delay time of signals respectively received from a plurality of neighbor cells, and reports the measured time to a serving cell or an anchor cell. The serving cell measures the location of a corresponding UE using the reported delay times.

In this case, the reference cell means a cell that may become a criterion for time difference of arrival (TDOA). A serving cell may correspond to the reference cell or if a UE has performed an operation, such as handover, a serving cell prior to the handover operation may correspond to the reference cell or the reference cell may not be changed regardless of the handover operation of a UE.

A common reference signal (CRS) or a synchronization signal (primary synchronization signal/secondary synchronization signal (PSS/SSS)) may be used as a measurement signal for determining the location of a UE, but a dedicated positioning reference signal (PRS) for a location service (LCS) may be used as the measurement signal.

A positioning reference (or criterion) signal may be represented as a position determination reference signal or a position determination pilot signal.

Hereinafter, a PRS is illustrated as a measurement signal used to determine the location of a UE, for convenience of description.

Positioning Reference Signal (PRS)

Next, a positioning reference signal (hereinafter referred to as a "PRS") is described.

A PRS is a reference signal used to determine the location of a UE and is transmitted through only resource blocks of a downlink subframe determined for PRS transmission.

A PRS sequence is defined by Equation 1.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, 2N_{RB}^{max,DL} - 1$$

In this case, $r_{l,n_s(m)}$ indicates a PRS sequence, $n_s$ indicates a slot number within a frame, and l indicates an OFDM symbol number within a slot. c(i) indicates a pseudo-random sequence, and a pseudo-random sequence generator is initialized as $c_{init}$, such as Equation 2, at the start point of each OFDM symbol.

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP} \quad \text{[Equation 2]}$$

In this case, $N_{ID}^{cell}$ is a physical-layer cell ID, $N_{CP}$ is 1 when an OFDM symbol has a normal cyclic prefix (CP) and 0 when it has an extended CP.

A PRS sequence $(r_{l,n_s(m)})$ may be mapped to a complex-valued modulation symbols $(a_{k,l}^{(p)})$, used as a reference signal for an antenna port 6 (p=6) in a slot $(n_s)$ configured for reference signal transmission according to Equation 3.

$$a_{k,l}^{(p)} = r_{l,n_s}(m') \quad \text{[Equation 3]}$$

In this case, a resource index pair (k,l) and m, m' values for reference signal transmission may be determined according to Equation 4 or Equation 5. In this case, Equation 4 indicates the case of a normal cyclic prefix, and Equation 5 indicates the case of an extended cyclic prefix.

$$k = 6(m + N_{RB}^{DL} - N_{RB}^{PRS}) + (6 - l + v_{shift}) \bmod 6 \quad \text{[Equation 4]}$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 } PBCH \text{ antenna ports)} \\ 2, 3, 5, 6 & \text{if } n_s \bmod 2 = 1 \text{ and (4 } PBCH \text{ antenna ports)} \end{cases}$$

$$m = 0, 1, \ldots, 2 \cdot N_{RB}^{PRS} - 1$$
$$m' = m + N_{RB}^{max,DL} - N_{RB}^{PRS}$$

$$k = 6(m + N_{RB}^{DL} - N_{RB}^{PRS}) + (5 - l + v_{shift}) \bmod 6 \quad \text{[Equation 5]}$$

$$l = \begin{cases} 4, 5 & \text{if } n_s \bmod 2 = 0 \\ 1, 2, 4, 5 & \text{if } n_s \bmod 2 = 1 \text{ and } (1 \text{ or } 2 \text{ } PBCH \text{ antenna ports}) \\ 2, 4, 5 & \text{if } n_s \bmod 2 = 1 \text{ and } (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

In this case, the bandwidth of a reference signal and the number ($N_{RB}^{PRS}$) of resource blocks are configured by a higher layer. Furthermore, the reference signal has a different frequency shift ($v_{shift}$) value for each cell. Such a cell-specific frequency shift is determined according to Equation 6.

$$v_{shift} = N_{ID}^{cell} \bmod 6 \quad \text{[Equation 6]}$$

If a preamble signal is mapped to a radio resource using such a method, the structure of a preamble transmitted in a specific subframe is shown in FIG. 7.

FIG. 13 is a diagram showing a pattern in which a PRS has been assigned to a resource element. FIG. 13(a) shows the case of a normal CP, and FIG. 13(b) shows the case of an extended CP.

Method of Determining Position of UE

Next, a method of determining the location of a UE is described below.

That is, in accordance with a method of determining the location of a UE using a PRS, a UE receives assistance data from a serving base station, receives a PRS from a reference cell and neighbor cells using the assistance data, calculates a reference signal time difference (hereinafter called an "RSTD") between the reference cell and the neighbor cells, and transmits the RSTD to the serving base station.

Thereafter, the serving base station transmits the RSTD to a location server. The location server determines the location of the UE using the RSTD.

The RSTD means a relative timing difference between the reference cell and the neighbor cells and is defined by Equation 7.

$$T_{subframeRxj} - T_{subframeRxi} \quad \text{[Equation 7]}$$

In this case, $T_{subframeRxj}$ is timing when a UE receives the start point of one subframe from a neighbor cell j, and $T_{subframeRxi}$ is timing when the UE receives the start point of one subframe closest to the one subframe received from the cell j, from a reference cell i.

A reference cell and neighbor cells may transmit PRSs at similar timing. If a reference cell and neighbor cells transmit PRSs at similar timing, a difference between timing when a UE receives from the PRS from the reference cell and timing when the UE receives the PRS from each of a plurality of neighbor cells is within a specific time range.

For example, a difference between timing when a UE receives a PRS from a reference cell and timing when the UE receives a PRS from each of a plurality of neighbor cells may be within 1 subframe.

In the definition of RSTD, assuming that one subframe of a UE received from a neighbor cell j is the first subframe of PRS positioning occasions of the neighbor cell j, one subframe received from a cell i closest to the one subframe received from the cell j is the first subframe of PRS positioning occasions of a reference cell i.

In this case, the PRS positioning occasions mean continuous downlink subframes to which a PRS has been allocated. Accordingly, RSTD becomes a difference between timing when a PRS is received from the neighbor cell j and timing when a PRS is received from the reference cell i.

In this case, timing when a PRS is received from a specific cell is called the time of arrival (hereinafter referred to as "TOA") of the PRS.

A method of determining the location of a UE using a PRS is described more specifically with reference to FIG. 14.

FIG. 14 is a flowchart showing an example of a method of determining the location of a UE.

As shown in FIG. 14, a higher layer of the UE receives assistance data from a location server (S1410).

The assistance data may include information about a reference cell and/or at least one neighbor cell, which is necessary for the UE to calculate RSTD.

Thereafter, when the assistance data is received, the higher layer of the UE forward the assistance data to the physical layer (S1420).

Thereafter, the physical layer of the UE configures a measurement interval for an RSTD using the PRS transmission periodicity of each of a plurality of cells as indicated in the assistance data (S1430).

When the measurement interval for an RSTD of each of the plurality of cells is configured using the PRS transmission periodicity, the UE calculates RSTD and transmits or reports the calculated RSTD value to the location server (S1440).

Hereinafter, each of steps for determining the location of a UE is described in detail.

First, the step S1410 of the UE to receive the assistance data from the higher layer is described.

The UE may receive the assistance data by requesting the assistance data from the location server through a base station.

FIG. 15 is a diagram showing a process for a UE to receive assistance data by requesting the assistance data from a base station.

As shown in FIG. 15, the UE transmits an assistance data request message "RequestAssistanceData message" to a location server through a base station. The location server transmits an assistance data provision message "ProvideAssistanceData message", including assistance data, to the UE.

In this case, the location server may transmit an additional assistance data provision message, including additional assistance data, to the UE.

The assistance data provision message finally transmitted by the location server includes an end transaction indicator indicating the last message.

Alternatively, the location server may transmit an assistance data provision message without a request from the UE.

Meanwhile, the UE (or target device) and the location server may mutually transmit location information. FIG. 16 is a diagram showing a method of transmitting location information.

A location server transmits a location information request ("RequestLocationInformation") message to a UE in order to request location information. In this case, the type of required location information may be indicated or additional assistance QoS may be indicated.

Thereafter, the UE transmits a location information provision ("ProvidedLocationInformation") message to the location server in order to transmit location information.

The transmitted location information needs to be matched with location information required in a previous step or must be a subset if the server does not clearly permit additional location information.

If requested, the UE transmits an additional location information provision ("ProvidedLocationInformation") message to the server in order to transmit location information.

The transmitted location information needs to be matched with location information required in a previous step or must be a subset if the server does not clearly permit additional location information.

The finally transmitted provision message includes an end transaction indicator indicating the last message.

Next, the assistance data received by the UE is further described in detail.

Table 1 is a table showing OTDOA assistance data included in the assistance data provision message.

TABLE 1

```
-- ASN1START
OTDOA-ProvideAssistanceData ::= SEQUENCE (
    otdoa-ReferenceCellInfo   OTDOA-ReferenceCellInfo       OPTIONAL, -- Need ON
    otdoa-NeighbourCellInfo   OTDOA-NeighbourCellInfoList   OPTIONAL, -- Need ON
    otdoa-Error OTDOA-Error OPTIONAL, -- Need ON
    ...
}
-- ASN1 STOP
```

As listed in Table 1, OTDOA assistance data includes OTDOA reference cell information (otdoa-ReferenceCellInfo) and OTDOA neighbor cell information (otdoa-NeighbourCellInfo).

First, the OTDOA reference cell information (otdoa-ReferenceCellInfo) included in the OTDOA assistance data is described.

Table 2 is a table showing the OTDOA reference cell information.

TABLE 2

```
-- ASN1START
OTDOA-ReferenceCellInfo ::= SEQUENCE {
    physCellId        INTEGER (0..503),
    cellGlobalId      ECGI                    OPTIONAL,   -- Need ON
    earfcnRef         ARFCN-ValueEUTRA        OPTIONAL,   -- Cond NotSameAsServ0
    antennaPortConfig ENUMERATED {ports1-or-2, ports4, ... }
                                              OPTIONAL,   -- Cond NotSameAsServ1
    cpLength          ENUMERATED {normal, extended, ... },
    prsInfo           PRS-Info                OPTIONAL,   -- Cond PRS
    ...,
    [[ earfcnRef-v9a0 ARFCN-ValueEUTRA-v9a0   OPTIONAL    -- Cond NotSameAsServ2
    ]]
}
-- ASN1STOP
```

The OTDOA reference cell information includes information about a reference cell.

As listed in Table 2, the OTDOA reference cell information includes a physical cell identity (physCellId), an antenna port configuration (antennaPortConfig), a cyclic prefix length (cpLength), and PRS information (prsInfo).

physCellId indicates a physical cell ID of the reference cell, and antennaPortConfig indicates whether a reference cell uses at least one antenna port or four antenna ports for a cell-specific reference signal.

cpLength means length information of a CP used by a reference cell to transmit a PRS. prsInfo of the information included in the OTDOA reference cell information (otdoa-ReferenceCellInfo) is described more specifically with reference to Table 4.

Table 3 is a table showing prsInfo.

TABLE 3

```
-- ASN1START
PRS-Info ::= SEQUENCE {
    prs-Bandwidth          ENUMERATED { n6, n15, n25, n50, n75, n100, ...},
    prs-ConfigurationIndex INTEGER (0..4095),
    numDL-Frames           ENUMERATED {sf-1, sf-2, sf-4, sf-6, ...},
    ...,
    prs-MutingInfo-r9      CHOICE{
        p02-r9                 BIT STRING (SIZE(2)),
        p04-r9                 BIT STRING (SIZE(4)),
        p08-r9                 BIT STRING (SIZE(8)),
        po16-r9                BIT STRING (SIZE(16)),
        ...
    }                      OPTIONAL                              -- Need OP
}
-- ASN1STOP
```

As shown in Table 3, prsInfo includes a PRS bandwidth (prs-Bandwidth), a PRS configuration index (prs-ConfigurationIndex), a downlink frame number (numDL-Frames), and PRS muting information (prs-MutingInfo).

prs-Bandwidth indicates a bandwidth used to configure a PRS. numDL-Frames indicates the number (Nprs) of continuous downlink subframes to which a PRS has been allocated.

prs-MutingInfo indicates the PRS muting configuration of a corresponding cell. The PRS muting configuration is defined by a periodic PRS muting sequence having the periodicity of a TPRS. The TPRS is indicated as the number of PRS positioning occasions. The positioning occasions include Nprs downlink subframes.

The PRS muting information may be defined based on the system frame number (SFN) of a serving cell or a reference cell. If the PRS muting information is defined based on the SFN of a serving cell, the first bit of a PRS muting sequence corresponds to first positioning occasions that start after the start point of a frame in which the system frame number (SFN) of a serving cell is 0. If the PRS muting information is defined based on the SFN of a reference cell, the first bit of a PRS muting sequence corresponds to first positioning occasions that start after the start point of a frame in which the SFN of a serving cell is 0.

prs-ConfigurationIndex indicates a PRS configuration index. The PRS configuration index (IPRS) indicates information about an occasion at which a PRS is transmitted.

Next, the OTDOA neighbor cell information (otdoa-NeighbourCellInfo) included in the OTDOA assistance data is described.

Table 4 shows the OTDOA neighbor cell information.

TABLE 4

```
-- ASN1START
OTDOA-NeighbourCellInfoList ::= SEQUENCE (SIZE (1..maxFreqLayers)) OF
OTDOA-NeighbourFreqInfo
OTDOA-NeighbourFreqInfo ::=SEQUENCE (SIZE (1..24)) OF
OTDOA-NeighbourCellInfoElement
OTDOA-NeighbourCellInfoElement ::=SEQUENCE {
    physCellId   INTEGER (0..503),
    cellGlobalId ECGI OPTIONAL, -- Need ON
    earfcn       ARFCN-ValueEUTRA OPTIONAL,    -- Cond
NotSameAsRef0
    cpLength     ENUMERATED {normal, extended, ...} OPTIONAL,  -- Cond
NotSameAsRef1
    prsInfo      PRS-Info OPTIONAL, -- Cond
NotSameAsRef2
    antennaPortConfig  ENUMERATED {ports-1-or-2, ports-4, ...} OPTIONAL,   -- Cond
NotsameAsRef3
    slotNumberOffset   INTEGER (0..19) OPTIONAL,  -- Cond
NotSameAsRef4
    prs-SubframeOffset INTEGER (0..1279) OPTIONAL,    -- Cond
InterFreq
    expectedRSTD       INTEGER (0..16383),
```

TABLE 4-continued

```
expectedRSTD-Uncertainty    INTEGER (0..1023),
...,
[[ earfcn-v9a0    ARFCN-ValueEUTRA-v9a0 OPTIONAL    -- Cond
NotSameAsRef5
]]
}
maxFreqLayers    INTEGER ::=3
-- ASN1STOP
```

As shown in Table 4, the OTDOA neighbor cell information includes at least one OTDOA neighbor cell information element (OTDOANeighbourCellInfoElement). A plurality of OTDOA neighbor cell information elements included in the OTDOA neighbor cell information may be arranged in descending power according to priority of a neighbor cell for the RSTD measurement of a UE.

That is, the first OTDOA neighbor cell information element included in the OTDOA neighbor cell information may be the OTDOA neighbor cell information element of a neighbor cell having the highest priority for the RSTD measurement of a UE.

The OTDOA neighbor cell information elements include a physical cell identity (physCellId), a cyclic prefix length (cpLength), PRS information (prsInfo), an antenna port configuration (antennaPortConfig), a slot number offset (slotNumberOffset), a PRS subframe offset (prs-SubframeOffset), an RSTD expected value (expectedRSTD) and the uncertainty of an RSTD expected value (expectedRSTDUncertainty).

physCellId indicates a physical cell ID of a neighbor cell. antennaPortConfig indicates whether a neighbor cell uses 1 (or 2) antenna ports or four antenna ports for a cell-specific reference signal.

cpLength indicates the length of a cyclic prefix of the PRS of a neighbor cell.

prsInfo indicates information about the PRS configuration of a neighbor cell. prsInfo included in the OTDOA neighbor cell information element has the same type as prsInfor included in the OTDOA reference cell information of Table 3. That is, prsInfo includes prs-Bandwidth, prs-ConfigurationIndex, numDL-Frames and prs-MutingInfo.

prs-Bandwidth indicates a bandwidth used to transmit the PRS of a neighbor cell. numDL-Frames indicates the number (Nprs) of continuous downlink subframes to which the PRS of a neighbor cell has been allocated. prs-MutingInfo indicates the PRS muting configuration of a neighbor cell. prs-ConfigurationIndex indicates the PRS configuration index of a neighbor cell.

slotNumberOffset indicates a slot number offset between a reference cell and a neighbor cell. The slot number offset means an offset from the start point of a specific radio frame of a reference cell to the start point of a radio frame of a neighbor cell that first comes after the specific radio frame. The slot number offset is represented as the number of slots. If the slot timing of a neighbor cell is the same as that of a reference cell, the slotNumberOffset field may be omitted.

prs-SubframeOffset is an offset between a specific first PRS subframe of a reference cell in a reference carrier frequency and the first PRS subframe of the PRS burst of a neighbor cell that first comes after the first PRS subframe in a different carrier frequency. The offset is represented as the number of subframes.

expectedRSTD is an RSTD value expected to be measured by a UE. When Ts is 1/(15000*2048), the resolution of expectedRSTD is 3 Ts.

expectedRSTD-Uncertainty indicates the uncertainty of an expectedRSTD value. That is, expectedRSTDUncertainty indicates an error range of the expectedRSTD value. The uncertainty of the expectedRSTD value is related to the estimation of a UE location of a location server. expectedRSTD-Uncertainty defines the search window of a UE, such as Equation 8. The resolution of expectedRSTD-Uncertainty is 3 Ts.

[expectedRSTD−expectedRSTD$_{Uncertainty}$<measured RSTD<expectedRSTD+ expectedRSTD$_{Uncertainty}$]    [Equation 8]

Referring back to the description of the step of determining the location of the UE, when a higher layer of the UE receives the assistance data from the location server, the higher layer forwards the assistance data to a physical layer (S1620). The physical layer configures a measurement interval for an RSTD using PRS transmission periodicity of each of the plurality of cells as indicated in the received assistance data (S1630).

In relation to this, a method of determining the PRS transmission periodicity based on a PRS configuration index included in prsInfo is described.

Table 5 shows PRS transmission periodicity TPRS and a PRS subframe offset $^{\Delta}$PRS according to the PRS configuration index.

TABLE 5

| PRS configuration Index I$_{PRS}$ | PRS period TPRS (subframes) | PRS subframe offset $^{\Delta}$PRS (subframes) |
|---|---|---|
| 0-159 | 160 | I$_{PRS}$ |
| 160-479 | 320 | I$_{PRS}$-160 |
| 480-1119 | 640 | I$_{PRS}$-480 |
| 1120-2399 | 1280 | I$_{PRS}$-1120 |
| 2400-4095 | Reserved | |

The physical layer receives the PRS configuration index from the higher layer. The PRS is transmitted only in a configured subframe and is transmitted in NPRS continuous downlink subframes. The NPRS is also configured in the higher layer. The first subframe of the continuous NPRS subframes in which the PRS is transmitted is a subframe satisfying Equation 9.

$$\left(10 \times n_f + \left\lfloor \frac{n_s}{2} \right\rfloor - \Delta_{PRS}\right) \bmod T_{PRS} = 0 \qquad [\text{Equation 9}]$$

In this case, $n_f$ is an SFN, and $n_s$ is a slot number.

That is, when the UE receives the assistance data provision message, it can be aware of each piece of PRS information using the PRS configuration index of at least one cell included in the assistance data provision message.

Next, a method for a UE to configure a measurement interval ($T_{RSTD}$) for an RSTD using PRS transmission periodicity in order to receive and measure a signal from a base station is described.

If physical layer cell IDs of neighbor cells and OTDOA assistance data are provided together, the UE may receive an RSTD and perform measurement. In a frequency band, n is at least 16 cells including a reference cell, and the reference cell satisfies a requirement within $T_{RSTD}$ms given below.

$$T_{RSTD}=T_{TRS}\cdot(M-1)+\Delta_{ms})$$ [Equation 10]

In this case, $T_{RSTD}$ is a total time necessary for search and measurement in the at least n cells. $T_{TRS}$ is location subframe configuration period unique to a cell. M indicates the number of PRS positioning occasions. $\Delta_{ms}$ includes a sampling time and a processing time as a measurement time for one PRS positioning occasion.

Table 6 is a list of contents related to the number M of positioning occasions.

TABLE 6

| Positioning subframe configuration period TPRS | Number of PRS positioning occasions M | |
|---|---|---|
| | f2 Note1 | f1 and f2 Note2 |
| 160 ms | 16 | 32 |
| >160 ms | 8 | 16 |

Note 1:
When inter-frequency RSTD measurements are performed over the reference cell and neighbour cells, which belong to the FDD inter-frequency carrier frequency f2.
Note 2:
When inter-frequency RSTD measurements are performed over the reference cell and the neighbour cells, which belong to the serving FDD carrier frequency f1 and the FDD inter-frequency carrier frequency f2 respectively.

When $T_{RSTD}$ is determined, the UE may transmit a measured RSTD within $T_{RSTD}$ (S840). In this case, the measured information is preferably transmitted after the $T_{RSTD}$ period elapses in order to guarantee certainty. In this case, if a set signal intensity condition is satisfied before the $T_{RSTD}$ period elapses, information related to the RSTD may be transmitted.

FIG. 17 is a diagram showing a process of forwarding assistance data to a physical layer and configuring a measurement interval for an RSTD using a PRS period.

Referring to FIG. 17, when assistance data is received by a higher layer (1710), the higher layer forwards the assistance data to the physical layer (1720), determines $T_{TRS}$ as indicated in the assistance data (1730), and determines $T_{RSTD}$ based on the determined $T_{TRS}$ (1740).

Accordingly, a PRS received from each cell may be measured based on each $T_{RSTD}$, POA may be calculated, and an RSTD value may be reported to a location server.

Meanwhile, RSTD measurement accuracy of a UE for all of measurement neighbor cell(i) must satisfy the following requirement. In the following requirement, it is assumed that a measurement report is not delayed by another LTE positioning protocol (LPP) signaling through a dedicated control channel (DCCH).

In RSTD measurement reporting delay, delay uncertainty occurring when a measurement report is inserted into the TTI of an uplink DCCH is not taken into consideration. In this case, the delay uncertainty is the same as 2×TTIDCCH. Furthermore, such measurement reporting delay does not include any delay that may be caused because there is no uplink resource when a UE transmits the measurement report.

An RSTD means a relative timing difference between a reference cell and a neighbor cell and is defined like Table 8.

Table 7 is a table for illustrating a reference signal time difference (RSTD).

TABLE 7

| Definition | An RSTD means a relative timing difference between a neighbour cell j and a reference cell i, defined as TSubframeRxj - TSubframeRxi, where: TSubframeRxj is the time when a UE receives the start of one subframe from the cell j, and TSubframeRxi is the time when the UE receives the corresponding start of one subframe from the cell i that is closest in time to the subframe received from the cell j. A reference point for an observed subframe time difference shall be the antenna connector of the UE. |
|---|---|
| Application | RRC_CONNECTED intra-frequency RRC_CONNECTED inter-frequency |

As described above, a reference cell and neighbor cells may transmit PRSs at a similar time. When the reference cell and the neighbor cells transmit the PRSs at the similar time, a difference between the time when a UE receives the PRS from the reference cell and the time when the UE receives the PRSs from the plurality of neighbor cells, respectively, is within a specific time range.

For example, a difference between the time when the UE receives the PRS from the reference cell and the time when the UE receives the PRSs from the plurality of neighbor cells, respectively, may be within 1 subframe. In the definition of the RSTD, assuming that one subframe received by the UE from the neighbor cell j is the first subframe of the PRS positioning occasions of the neighbor cell j, one subframe received from the cell i that is closest to the one subframe received from the cell j is the first subframe of the PRS positioning occasions of the reference cell i.

In this case, the PRS positioning occasions mean continuous downlink subframes to which a PRS has been allocated.

Accordingly, the RSTD becomes a difference between the time when the PRS is received from the neighbor cell j and the time when the PRS is received from the reference cell i.

Hereinafter, a method of estimating the distance D2D UEs in a device-to-device (D2D) (or sidelink) environment, which is proposed in this specification, is described.

Specifically, this specification proposes a detailed method of estimating the distance between a specific D2D UE and another D2D UE (distant from the specific D2D UE) using a value (e.g., reference signal time difference (RSTD)) related to the distance that may be aware from a reference eNB and the distance between corresponding reference eNBs in a D2D environment.

If a specific D2D UE is aware of a distance from (surrounding) another D2D UE(s) through the method proposed in this specification, it may use various services in a D2D environment using it.

Examples of the various services may include a service for recommending a nearby acquaintance or a person having the same matter of concern and an advertising service for D2D UEs within a specific distance (or range).

The following method proposed in this specification may be applied to D2D communication in addition to D2D discovery.

Hereinafter, for convenience of understanding, a D2D UE, that is, the subject of measurement of the distance between D2D UEs, is expressed as an "operation UE." A D2D UE, that is, the subject of measurement of the distance between D2D UEs, is expressed or called a "target UE."

Furthermore, an RSTD is described as an example of information or a value related to a distance that may be aware from a reference eNB.

In this case, each D2D UE may calculate the RSTD through a reference signal (RS) transmitted (or received) from an eNB to which the D2D UE belongs.

The RSTD($T_{nm}$) value may indicate a difference in the distance between the two reference eNBs of a target UE.

That is, the RSTD($T_{nm}$) value indicates a difference between a distance from the target UE to the reference eNBn and a distance from the target UE to a reference eNBm.

In the method proposed in this specification, any value may be applied if it is related to a distance that a target UE can be aware from a reference eNB although the value is not the RSTD value.

Hereinafter, a method of estimating the distance between D2D UEs (distance between an operation UE and a target UE), which is proposed in this specification, is described in stages with reference to drawings.

As will be described later, a method of estimating the distance between an operation UE and a target UE may be basically divided into three steps.

First Step of Method of Estimating Distance Between D2D UEs

First, the first step of a method of estimating the distance between an operation UE and a target UE is described.

The target UE calculates a difference in the distance between multiple eNBs, that is, an RSTD, through RSs transmitted by the respective eNBs.

For example, assuming that three reference eNBs (e.g., an eNB1, an eNB2, and an eNB3) used by the target UE are present, three RSTD values, such as $T_{12}$, $T_{23}$, and $T_{13}$, may be obtained.

Furthermore, it is assumed that the distance between an eNBn and an eNBm is $a_{nm}$(n, m=1,2,3) and the target UE may be aware of $a_{nm}$($a_{12}$, $a_{13}$, $a_{23}$) received from a corresponding network (or corresponding eNB).

In a D2D communication environment, D2D UEs may directly exchange information. In contrast, in a 2D discovery environment, each D2D UE transmits a discovery signal nearby in order to provide notification of its presence.

Accordingly, when a target UE transmits the aforementioned RSTD($T_{nm}$) and the distance ($a_{nm}$) between eNBs together in D2D data or a D2D discovery signal, if an operation UE(s) that has received the D2D data or the D2D discovery signal is aware of the distance between the operation UE(s) and each of the eNBs, the operation UEs can be aware of the distance from the target UE through the pieces of information.

In this case, a signal in which the target UE transmits the corresponding information ($T_{nm}$ and $a_{nm}$) is not limited to the aforementioned signals (D2D data or D2D discovery signal), and may include any direct signals that may be exchanged between the target UE and the operation UE.

Furthermore, the $a_{nm}$ value, that is, the distance between eNBs, among pieces of information transmitted by the target UE may be configured to be directly aware by the operation UE from a network or from the eNB.

From a viewpoint of a specific operation UE, contents related to the first step are shown in FIG. 18.

FIG. 18 is a diagram showing an example of the first step of estimating the distance between D2D UEs, which is proposed in this specification.

As shown in FIG. 18, circles having $d_1$, $d_2$, and $d_3$, that is, distances up to respective reference eNBs (eNB1, eNB2, and eNB3) configured by a target UE, as radii are drawn around an operation UE.

In this case, the operation UE may check the distances ($d_1$, $d_2$, $d_3$) from the respective reference eNBs from (1) timing advance (TA) obtained through a random access procedure or (2) signals (e.g., positioning reference signals (PRSs)) transmitted by the respective reference eNBs.

Specifically, it is assumed that the eNB1 is positioned at a location of A.

First, a circle having the eNB1(A) as the center and $a_{12}$ as a radius and a circle having the eNB1(A) as the center and $a_{13}$ as a radius are drawn.

In this case, as shown in FIG. 18, the eNB2 may be positioned at a location of B or D, and the eNB3 may be positioned at a location of E or C.

Next, when a circle having the eNB2(B) as the center and $a_{23}$ as a radius is drawn, the location of the eNB3 may be determined as C.

Alternatively, when a circle having the eNB2(D) as the center and $a_{23}$ as a radius is drawn, the location of the eNB3 may be determined as E.

When the locations where the eNB1, eNB2 and eNB3 may be present are sequentially connected and represented as a triangle, the corresponding triangle may be represented as a triangle ABC or a triangle ADE.

The triangle ABC or the triangle ADE may be turned clockwise or counterclockwise around the operation UE.

The two triangles (triangle ABC and triangle ADE) are axially symmetric to a segment of line that connects the operation UE and the eNB1(A). Accordingly, although any one of the two triangles is selected, a relative distance from the operation UE to the target UE may be estimated identically.

For convenience of description, a method of estimating a relative distance from the operation UE to the target UE is described by taking the triangle ABC of FIG. 18 as an example.

Second Step of Method of Estimating Distance Between D2D UEs

Next, the second step of estimating the distance between an operation UE and a target UE is described.

FIG. 19 is a diagram showing an example of the second step of estimating the distance between D2D UEs, which is proposed in this specification.

As shown in FIG. 19, the operation UE may sort out candidates at locations where the target UE may be present using two RSTD values of pieces of information transmitted by the target UE.

That is, a hyperbola 1($T_{12}$=const), that is, a set of points having a constant difference in a distance from two points A and B, is drawn using an RSTD($T_{12}$) value obtained from the eNB1 and the eNB2.

Another hyperbola (hyperbola 2), that is, a set of points having a constant difference in a distance from two points B and C, is drawn using an RSTD($T_{23}$=const) value obtained from the eNB2 and the eNB3 using the same method.

From FIG. 19, it may be seen that four places 1910 are present at the point where the two hyperbolas (hyperbola 1 and hyperbola 2) are met.

It may be construed that candidate groups, that is, a distance from the operation UE to the target UE, are four types or candidate points where the target UE may be positioned are four places.

Candidates at locations where the target UE may be present may be greater than or smaller than the four places shown in FIG. 19 depending on the distance between eNBs and an RSTD value.

Third Step of Method of Estimating Distance Between D2D UEs

Next, the third step of estimating the distance between an operation UE and a target UE is described.

FIG. 20 is a diagram showing an example of the third step of estimating the distance between D2D UEs, which is proposed in this specification.

In the third step of estimating the distance between D2D UEs, the last hyperbola (hyperbola 3, $T_{13}$=const) is indicated using an RSTD($T_{13}$) value obtained from the eNB1 and the eNB3. Finally, the distance between the operation UE and the target UE is measured.

As shown in FIG. 20, as a result, there is a point 2010 where the different three hyperbolas (hyperbola 1, hyperbola 2 and hyperbola 3) are met.

The point where the three different hyperbolas are met means a point where the target UE is positioned. The distance between the point where the operation UE is positioned and the point where the three different hyperbolas are met may be estimated as $d_t$ corresponding to a relative distance between the operation UE and the target UE.

Conclusionally, in a D2D discovery environment, when at least three RSTD values measured by a target UE and the distance between at least three reference eNBs is transmitted to an operation UE through a previously agreed specific channel (or a specific signal or specific message), the operation UE may estimate a distance from the target UE using the received values.

Additionally, the aforementioned pieces of information, that is, the distance between reference eNBs that may be aware from a specific D2D UE and a value (e.g., RSTD) related to the distance that may be aware from a corresponding reference eNB, may be configured to be periodically transmitted from a specific D2D UE to surrounding different D2D UEs in order for the surrounding different D2D UE to measure a relative distance from the specific D2D UE.

In this case, the aforementioned information is information used to estimate the distance between D2D UEs and may be simply represented as "inter-D2D UE distance estimation information" or "control information related to inter-D2D UE distance estimation."

In this case, if a specific D2D UE delivers or transmits inter-D2D UE distance estimation information to surrounding different D2D UEs, the specific D2D UE may differently set the accuracy (or information density) of information to be transmitted to the surrounding different D2D UEs based on a distance or channel state.

As described above, the reason why the accuracy of information to be transmitted to surrounding different D2D UEs is configured to be changed is that a relative distance from D2D UEs located near a specific D2D UE (or having a good channel state) requires information of high accuracy for various D2D services and only information of low accuracy may be useful for a relative distance from D2D UEs not located near a specific D2D UE (or not having a good channel state).

In this case, the reason why the accuracy of information to be transmitted to the D2D UEs not located near the specific D2D UE is configured to be low is that an approximate distance up to a remote corresponding D2D UE can be aware although there is an error due to the information of low accuracy.

As described above, a method of differently configuring the accuracy of information transmitted from the specific D2D UE to the surrounding different D2D UEs may include various methods as follows.

In a first method, it may be configured that the coding rate (or repetition number) of the transmitted information is constantly fixed and corresponding information is transmitted to surrounding (or having a good channel state) different D2D UEs with a relatively short period.

Furthermore, it may be configured that corresponding information is transmitted to long-distance (or not having a good channel state) different D2D UEs with a relatively long period.

In a second method, it may be configured that transmission periodicity of the transmitted information is constantly fixed and corresponding information is transmitted to short-distance (or having a good channel state) different D2D UEs using a high coding rate (or a repetition number is set to be small).

Furthermore, it may be configured that corresponding information is transmitted to long-distance (or not having a good channel state) different D2D UEs using a low coding rate (or a repetition number is set to be great).

A third method is a method of combining and using the two methods (first method and third method).

That is, it may be configured that corresponding information is transmitted to short-distance (or having a good channel state) different D2D UEs using a high coding rate (or a repetition number is set to be small) in a short period.

Furthermore, it may be configured that corresponding information is transmitted to long-distance (or not having a good channel state) different D2D UEs using a low coding rate (or a repetition number is set to be small) in a long period.

In a fourth method, a method of setting low power of a signal transmitted to short-distance D2D UEs or setting high power of a signal transmitted to long-distance different D2D UEs for a gain in terms of power saving may also be taken into consideration.

FIG. 21 is a flowchart showing an example of a method of estimating the distance between D2D UEs, which is proposed in this specification.

First, a first D2D UE receives a specific message, including first distance information related to a distance difference between a second D2D UE and at least three reference eNBs configured by the second D2D UE and second distance information indicating the distance between the at least three reference eNBs, from the second D2D UE (S2110).

The first distance information may be determined based on a reference signal (RS) transmitted by each of the reference eNBs.

The reference signal may be a positioning reference signal (PRS).

The first distance information may be a reference signal time difference (RSTD) indicating the distance between the times of reference signals transmitted by the respective reference eNBs.

The first D2D UE may indicate an operation UE, that is, the subject of distance estimation between the D2D UEs. The second D2D UE may be a target UE, that is, the subject of distance estimation between the D2D UEs.

Furthermore, the specific message may be a D2D discovery signal or D2D data.

Furthermore, at least one of transmission periodicity, coding rate and transmit power of the first distance information and second distance information received from the second D2D UE may be different set depending on a distance from the second D2D UE.

Thereafter, the first D2D UE measures a distance from each of the reference eNBs (S2120).

Thereafter, the first D2D UE estimates a distance from the second D2D UE using the measured distance from each of the reference eNBs, the first distance information and the second distance information (S2130).

Specifically, in order to determine the distance from the second D2D UE, first, the first D2D UE determines a candidate point where the second D2D UE may be positioned based on the second distance information.

Furthermore, the first D2D UE determines the location of the second D2D UE using the first distance information at the determined candidate point.

In this case, in order to determine the candidate point, the first D2D UE forms a circle having the distance between the reference eNBs as a radius and the position of each reference eNB as the center.

Furthermore, in order to determine the location of the second D2D UE, the first D2D UE forms at least three hyperbolas based on the positions of two reference eNBs using the first distance information.

Furthermore, the first D2D UE determines a point where the formed at least three hyperbolas are met in common to be the location of the second D2D UE in the candidate point.

In this case, the measured distance from each of the reference eNBs may be measured using timing advance (TA) obtained through a random access procedure with each reference eNB or may be measured using a positioning reference signal transmitted by each of the reference eNBs.

General Apparatus to which the Present Invention May be Applied

FIG. 22 illustrates the block configuration of a wireless communication apparatus to which a method proposed in this specification may be applied.

Referring to FIG. 22, the wireless communication system includes an eNB 2210 and a plurality of UEs 2220 positioned within the eNB 2210 area. In this case, the UE 2220 may correspond to the aforementioned terminal, node, device, RRH, relay, TP/RP or RSU.

The eNB 2210 includes a processor 2211, memory 2212 and a radio frequency (RF) unit 2213. The processor 2211 implements the functions, processes and/or methods proposed in FIGS. 1 to 21. The layers of a radio interface protocol may be implemented by the processor 2211. The memory 2212 is connected to the processor 2211 and stores various types of information for driving the processor 2211. The RF unit 2213 is connected to the processor 2211 and transmits and/or receives radio signals.

The UE 2220 includes a processor 2221, memory 2222 and an RF unit 2223. The processor 2221 implements the functions, processes and/or methods proposed in FIGS. 1 to 21. The layers of a radio interface protocol may be implemented by the processor 2221. The memory 2222 is connected to the processor 2221 and stores various types of information for driving the processor 2221. The RF unit 2223 is connected to the processor 2212 and transmits and/or receives radio signals.

The memory 2212, 2222 may be positioned inside or outside the processor 2211, 2221 and may be connected to the processor 2211, 2221 by various well-known means.

Furthermore, the eNB 2210 and/or the UE 2220 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Although examples in which the method for performing communication between UEs in a wireless communication system of the present invention has been applied to the 3GPP LTE/LTE-A system have been described, the method may be applied to various wireless communication systems in addition to the 3GPP LTE/LTE-A system.

The invention claimed is:

1. A method of estimating a distance between device-to-device (D2D) user equipments (UEs) in a wireless communication system, the method performed by a first D2D UE comprising:

receiving, from a second D2D UE, a specific message comprising first distance information related to a distance difference between the second D2D UE and at least three reference eNBs configured by the second D2D UE and second distance information indicating a distance between the at least three reference eNBs;

measuring a distance between the reference eNBs; and estimating a distance from the second D2D UE using the measured distances between the reference eNBs, the first distance information and the second distance information.

2. The method of claim 1, wherein the first distance information is determined based on reference signals (RS) transmitted by the respective reference eNBs.

3. The method of claim 2, wherein the reference signal comprises a positioning reference signal (PRS).

4. The method of claim 2, wherein the first distance information comprises a reference signal time difference (RSTD) indicating a difference between times of the reference signals transmitted by the respective reference eNBs.

5. The method of claim 1, wherein:

the first D2D UE indicates an operation UE which is a subject of distance estimation between the D2D UEs, and the second D2D UE is a target UE which is a subject of distance estimation between the D2D UEs.

6. The method of claim 1, wherein estimating the distance from the second D2D UE comprises:

determining a candidate point where the second D2D UE is able to be positioned based on the second distance information; and determining a position of the second D2D UE using the first distance information at the determined candidate point.

7. The method of claim 6, wherein determining the candidate point comprises forming a circle using a distance between the reference eNBs as a radius and a position of each reference eNB as a center.

8. The method of claim 7, wherein:

determining the position of the second D2D UE comprises forming at least three hyperbolas based on positions of two reference eNBs using the first distance information, and a point where the formed at least three hyperbolas are met in common among the candidate points is determined as the position of the second D2D UE.

9. The method of claim 8, wherein the measured distance between the reference eNBs is measured using timing advance (TA) obtained through a random access procedure with each reference eNB or is measured using a positioning reference signal transmitted by each of the reference eNBs.

10. The method of claim 9, wherein at least one of transmission periodicity, a coding rate and transmit power is differently set in each of the first distance information and second distance information, received from the second D2D UE, depending on the distance from the second D2D UE.

11. The method of claim 1, wherein the specific message comprises a D2D discovery signal or D2D data.

12. A first device-to-device (D2D) user equipment (UE) for estimating a distance between D2D UEs in a wireless communication system, the D2D UE comprising:

a radio frequency (RF) unit for transmitting and receiving radio signals; and a processor functionally connected to the RF unit, wherein the processor is configured to control to:

receive, from a second D2D UE, a specific message comprising first distance information related to a distance difference between the second D2D UE and at least three reference eNBs configured by the second D2D UE and second distance information indicating a distance between the at least three reference eNBs;

measure a distance between the reference eNBs; and estimate a distance from the second D2D UE using the measured distances between the reference eNBs, the first distance information and the second distance information.

* * * * *